US008860323B2

(12) United States Patent
DeVincentis

(10) Patent No.: US 8,860,323 B2
(45) Date of Patent: Oct. 14, 2014

(54) PLASMA LAMP WITH LUMPED COMPONENTS

(75) Inventor: Marc DeVincentis, Palo Alto, CA (US)

(73) Assignee: Luxim Corporation, Santa Clara, CA (US)

( * ) Notice: Subject to any disclaimer, the term of this patent is extended or adjusted under 35 U.S.C. 154(b) by 556 days.

(21) Appl. No.: 13/250,063

(22) Filed: Sep. 30, 2011

(65) Prior Publication Data

US 2012/0086334 A1     Apr. 12, 2012

Related U.S. Application Data

(60) Provisional application No. 61/388,286, filed on Sep. 30, 2010, provisional application No. 61/426,958, filed on Dec. 23, 2010.

(51) Int. Cl.
*H05B 41/16* (2006.01)
(52) U.S. Cl.
USPC ........... 315/248; 315/244; 315/246; 315/242; 315/241 R
(58) Field of Classification Search
USPC ....................... 315/248, 246, 241 R, 242, 244
See application file for complete search history.

(56) References Cited

U.S. PATENT DOCUMENTS

| | | | |
|---|---|---|---|
| 3,787,705 A | 1/1974 | Bolin et al. | |
| 3,826,950 A | 7/1974 | Hruda et al. | |
| 4,001,631 A | 1/1977 | McNeill et al. | |
| 4,206,387 A | 6/1980 | Kramer et al. | |
| 4,485,332 A | 11/1984 | Ury et al. | |
| 4,498,029 A | 2/1985 | Yoshizawa et al. | |
| 4,633,140 A | 12/1986 | Lynch et al. | |
| 4,749,915 A | 6/1988 | Lynch et al. | |
| 4,795,658 A | 1/1989 | Kano et al. | |
| 4,887,192 A | 12/1989 | Simpson et al. | |
| 4,950,059 A | 8/1990 | Roberts | |
| 4,975,625 A | 12/1990 | Lynch et al. | |
| 4,978,891 A | 12/1990 | Ury | |
| 5,039,903 A | 8/1991 | Farrall | |
| 5,070,277 A | 12/1991 | Lapatovich | |

(Continued)

FOREIGN PATENT DOCUMENTS

| CN | 103340018 A | 10/2013 |
|---|---|---|
| JP | 8148127 | 6/1996 |

(Continued)

OTHER PUBLICATIONS

"International Application Serial No. PCT/US2011/054219, Search Report mailed Jan. 20, 2012", 3 pgs.

(Continued)

*Primary Examiner* — Tuyet Thi Vo
(74) *Attorney, Agent, or Firm* — Schwegman Lundberg & Woessner, P.A.

(57) ABSTRACT

An electrodeless plasma lamp is provided. The lamp includes a conductive enclosure including a dielectric material (e.g., air) and a bulb containing a fill to form a light emitting plasma. A radio frequency (RF) power source is coupled into to the enclosure. At least one conductive applicator applies power from the enclosure to the bulb and at least one lumped inductive element is coupled between the RF feed and applicator. The lumped inductive element may be a helically wound coil. In an example embodiment, the lamp includes first and second lumped inductive elements. The first and second lumped inductive elements may extend from opposed end walls of the enclosure. The first lumped inductive element may be connected to a first conductive applicator located proximate a first end of the bulb and the second lumped inductive element may be connected to a second conductive applicator located proximate a second end of the bulb.

31 Claims, 22 Drawing Sheets

(56) References Cited

U.S. PATENT DOCUMENTS

| | | | |
|---|---|---|---|
| 5,072,157 A | 12/1991 | Greb et al. |
| 5,086,258 A | 2/1992 | Mucklejohn et al. |
| 5,361,274 A | 11/1994 | Simpson et al. |
| 5,438,242 A | 8/1995 | Simpson |
| 5,448,135 A | 9/1995 | Simpson |
| 5,498,937 A | 3/1996 | Korber et al. |
| 5,525,865 A | 6/1996 | Simpson |
| 5,545,953 A | 8/1996 | Lapatovich et al. |
| 5,594,303 A | 1/1997 | Simpson et al. |
| 5,786,667 A | 7/1998 | Simpson et al. |
| 5,910,710 A | 6/1999 | Simpson |
| 5,910,754 A | 6/1999 | Simpson et al. |
| 5,923,116 A | 7/1999 | Mercer et al. |
| 6,020,800 A | 2/2000 | Arakawa et al. |
| 6,031,333 A | 2/2000 | Simpson |
| 6,049,170 A | 4/2000 | Hochi et al. |
| 6,137,237 A | 10/2000 | MacLennan et al. |
| 6,159,055 A | 12/2000 | Satitpunwaycha et al. |
| 6,246,160 B1 | 6/2001 | MacLennan et al. |
| 6,252,346 B1 | 6/2001 | Turner et al. |
| 6,265,813 B1 | 7/2001 | Knox et al. |
| 6,313,587 B1 | 11/2001 | MacLennan et al. |
| 6,424,099 B1 | 7/2002 | Kirkpatrick et al. |
| 6,566,817 B2 | 5/2003 | Lapatovich |
| 6,617,806 B2 | 9/2003 | Kirkpatrick et al. |
| 6,666,739 B2 | 12/2003 | Pothoven et al. |
| 6,737,809 B2 | 5/2004 | Espiau et al. |
| 6,856,092 B2 | 2/2005 | Pothoven et al. |
| 6,922,021 B2 | 7/2005 | Espiau et al. |
| 7,034,464 B1 | 4/2006 | Izadian et al. |
| 7,291,985 B2 | 11/2007 | Espiau et al. |
| 7,348,732 B2 | 3/2008 | Espiau et al. |
| 7,358,678 B2 | 4/2008 | Espiau et al. |
| 7,362,054 B2 | 4/2008 | Espiau et al. |
| 7,362,055 B2 | 4/2008 | Espiau et al. |
| 7,362,056 B2 | 4/2008 | Espiau et al. |
| 7,372,209 B2 | 5/2008 | Espiau et al. |
| 7,391,158 B2 | 6/2008 | Espiau et al. |
| 7,429,818 B2 | 9/2008 | Chang et al. |
| 2001/0035720 A1 | 11/2001 | Guthrie et al. |
| 2005/0212456 A1 | 9/2005 | Espiau et al. |
| 2005/0286263 A1 | 12/2005 | Champion et al. |
| 2006/0250090 A9 | 11/2006 | Guthrie et al. |
| 2007/0109069 A1 | 5/2007 | Espiau et al. |
| 2008/0180028 A1 | 7/2008 | Collins et al. |
| 2008/0211971 A1 | 9/2008 | Pradhan |
| 2009/0284166 A1 | 11/2009 | DeVincentis et al. |
| 2010/0231472 A1 | 9/2010 | Tran |

FOREIGN PATENT DOCUMENTS

| | | | |
|---|---|---|---|
| JP | 2001266803 A | 9/2001 |
| JP | 2003249197 A | 9/2003 |
| KR | 1020050018587 A | 2/2005 |
| WO | WO-2006070190 A1 | 7/2006 |
| WO | WO-2006129102 A2 | 12/2006 |
| WO | WO-2007138276 A2 | 12/2007 |
| WO | WO-2012044932 A1 | 4/2012 |

OTHER PUBLICATIONS

"International Application Serial No. PCT/US2011/054219, Written Opinion mailed Jan. 20, 2012", 5 pgs.

"International Application Serial No. PCT/US2011/054219, International Preliminary Report on Patentability mailed Apr. 11, 2013", 8 pgs.

"Chapter 4—Cavity Resonators, Army Technical Manual, TM 11-673—Generation and Transmission of Microwave Energy", (Jun. 1953), 12 pgs.

"Chapter 6.3—Rectangular Waveguide Cavities", in: Microwave Engineering, Pozar, D. M., Editor (John Wiley & Sons, Inc.), (Jul. 1997), pp. 313-318.

Espiau, F. M., et al., "Plasma Lamp", U.S. Appl. No. 60/022,028, filed Jul. 31, 2000, 28 pgs.

Guthrie, C., et al., "A Corregated Wave-Guide Used for the Excitation of an Electrode-Less Metal Halide Plasma Lamp Incorporating a Solid Dielectric Material", U.S. Appl. No. 60/224,060, filed Aug. 9, 2000, 9 pgs.

Guthrie, C., et al., "A Method for Connecting the Antenna on a Printed Wiring Board to a Wave-Guide in a Light Source in Which an Electrode-Less Lamp Is Built Into the Wave-Guide Structure", U.S. Appl. No. 60/224,061, filed Aug. 9, 2000, 9 pgs.

Guthrie, C., "D.R.I. Drawings—Wave Guide Lamp Concept 8 (WGC008); Wave Guide Lamp Concept 9 (WGC009); and Wave Guide Lamp Concept 10 (WGC010)", Guthrie Exhibit 2173, Board of Patent Appeals and Interferences (Interference No. 105,393), (Jun. 28, 2000), 3 pgs.

Guthrie, Charles, et al., "Electrodeless Incandescent Bulb", U.S. Appl. No. 60/639,857, filed Dec. 27, 2004, 16 pgs.

Guthrie, Charles, "Lamp", U.S. Appl. No. 60/687,458, filed Jun. 6, 2005, 12 pgs.

Guthrie, Charles, et al., "Lamp", U.S. Appl. No. 60/687,280, filed Jun. 3, 2005, 17 pgs.

Inventors Not Listed, "LAMP", International Application Serial No. PCT_GB2007_001935, International filed May 24, 2007, GB Application Serial No. 0610580.3, filed May 30, 2006.

Izadian, J. S., et al., "Generating Light From Electromagnetic Energy", U.S. Appl. No. 60/337,057, filed Nov. 6, 2001, 120 pgs.

Pozar, D. M., "Section 5.8, Tapered Lines", In: Microwave Engineering, 3rd Edition, 2005 (John Wiley & Sons, Inc.), (2005), 9 pgs.

Pozar, D. M., "Section 6.4, Circular Waveguide Cavities", in: Microwave Engineering, 3rd Edition, 2005 (John Wiley & Sons, Inc.), (2005), 8 pgs.

Prior, G., et al., "Quartz Bulb Enclosed in a Wave-Guide", U.S. Appl. No. 60/234,415, filed Sep. 21, 2000, 5 pgs.

Prior, G., et al., "Wave-Guide Used for the Excitation of an Electrode-Less Metal Halide Plasma Lamp Incorporating a Solid Dielectric Material", U.S. Appl. No. 60/224,059, filed Aug. 9, 2000, 7 pgs.

Prior, G., et al., "Wave-Guide Used for the Excitation of an Electrode-Less Metal Halide Plasma Lamp Incorporating a Solid Dielectric Material", U.S. Appl. No. 60/224,298, filed Aug. 10, 2000, 5 pgs.

Sandberg, E., et al., "A Mechanical Means of Sealing the Window to an Electrode-Less Metal Halide Bulb That Is Integrated Into a Waveguide", U.S. Appl. No. 60/262,536, filed Jan. 17, 2001, 6 pgs.

Sandberg, E., "An Improved Drive Circuit for an Electrode-Less Plasma Lamp That Is Embedded in a Waveguide", U.S. Appl. No. 60/241,198, filed Oct. 17, 2000, 7 pgs.

Sandberg, E., "Light Source for Use in Microdisplay Based Light Engines", U.S. Appl. No. 60/192,73, filed Mar. 27, 2000, 31 pgs.

Smoler, D., "E-Mail to C. Guthrie re: Ridged Waveguide Ideas", (Jun. 27, 2000), 2 pgs.

Wharmby, D. O., "Chapter 11—Electrodeless Lamps", In: Lamps & Lighting, 4th Edition, 1997 (Arnold & John Wiley & Sons, Inc., (1997), 13 pgs.

Wharmby, D. O., "Electrodeless Lamps for Lighting: A Review", IEEE Proceedings-A, vol. 140 (6), (Nov. 1993), 9 pgs.

Wilson, D et al., "Use of a Coating to Prevent the Reduction of Ceramic to Elemental Metal in the Bulb of a Wave-Guide Lamp", U.S. Appl. No. 60/224,866, filed Aug. 11, 2000, 3 pgs.

Wilson, D., et al., "Electrode-Less Metal Halide Plasma Lamp With Integrated Electronics", U.S. Appl. No. 60/224,290, filed Aug. 10, 2000, 9 pgs.

Wilson, D., et al., "High Temperature, Low Cost Window Sealing Technique for Plasma Lamps", U.S. Appl. No. 60/224,291, filed Aug. 10, 2000, 5 pgs.

Wilson, D., et al., "Light Source Consisting of an Electrode-Less Metal Halide Plasma Bulb That Is Integrated Into a Wave-Guide", U.S. Appl. No. 60/224,289, filed Aug. 10, 2000, 6 pgs.

Wilson, D., et al., "Means to Reduce Emi in a Wave-Guide", U.S. Appl. No. 60/224,503, filed Aug. 10, 2000, 20 pgs.

Wilson, D., et al., "R.F. Wave-Guide Into Which an Insert of a Hermetric Material That Has Been Either Molded or Plasma Deposited", U.S. Appl. No. 60/224,257, filed Aug. 10, 2000, 5 pgs.

Wilson, D., et al., "Use of a Heat Sink in a Plasma Light Source (Located Between a Wave Guide That Incorporates the Bulb and the Drive Electronics", U.S. Appl. No. 60/224,961, filed Aug. 11, 2000, 6 pgs.

Wilson, D., et al., "Use of a Heat Sink in a Plasma Light Source (Located Externally and Surrounding the Lamp Assembly)", U.S. Appl. No. 60/224,617, filed Aug. 11, 2000, 20 pgs.

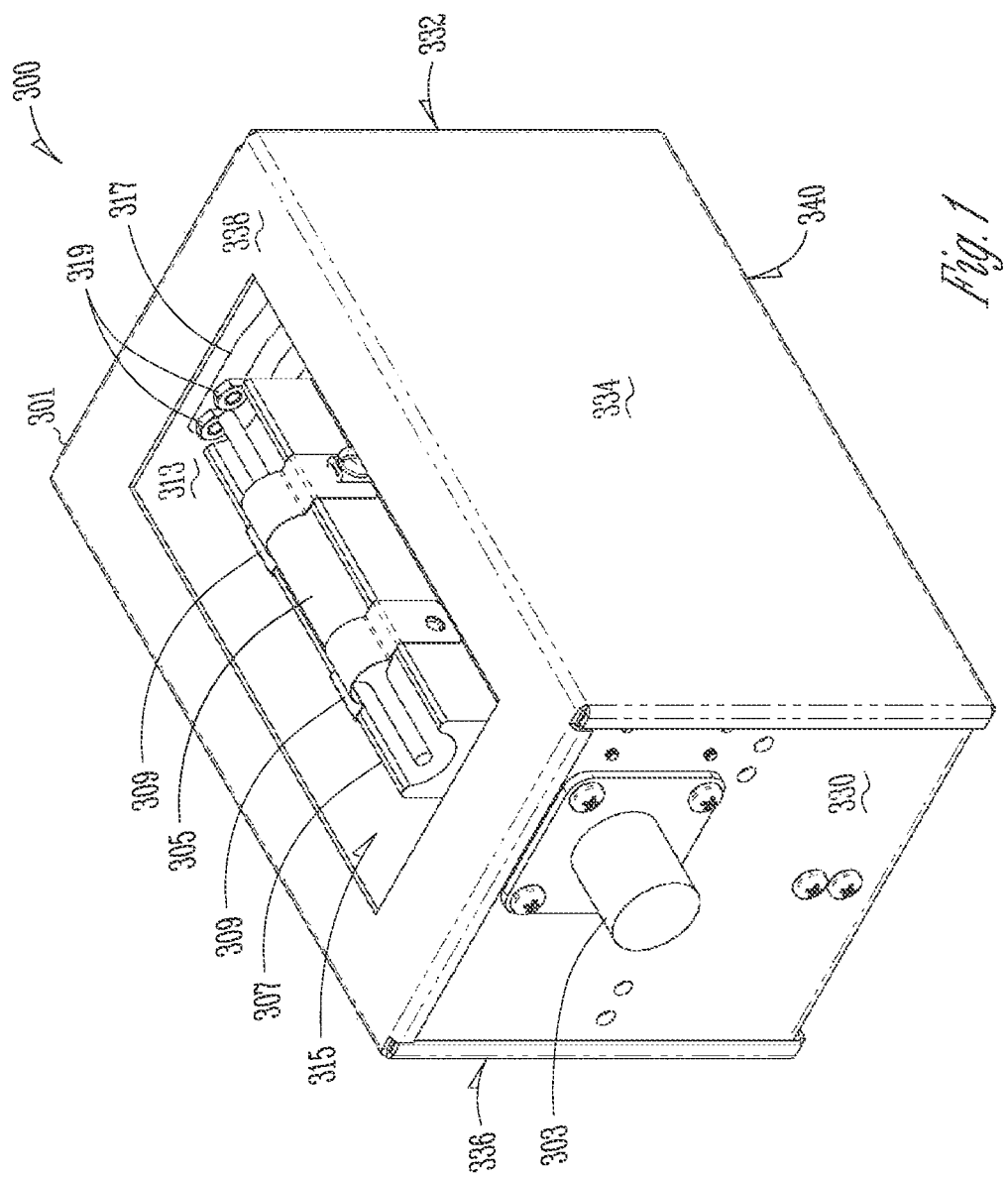

PRE-IGNITION E-FIELD

E-FIELD WITH PLASMA

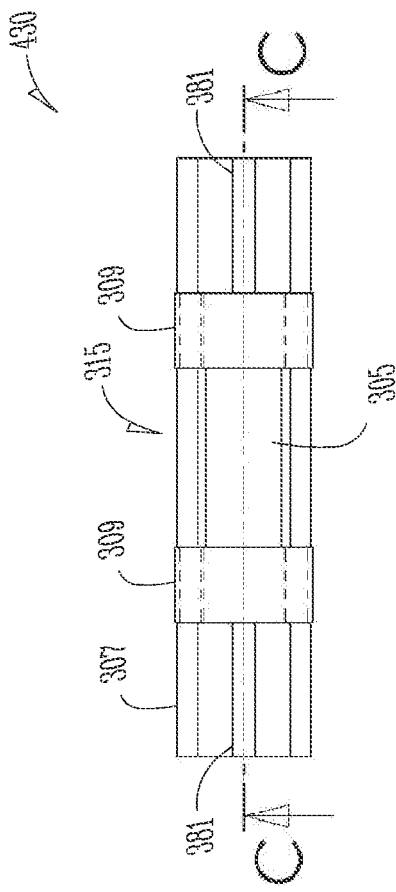
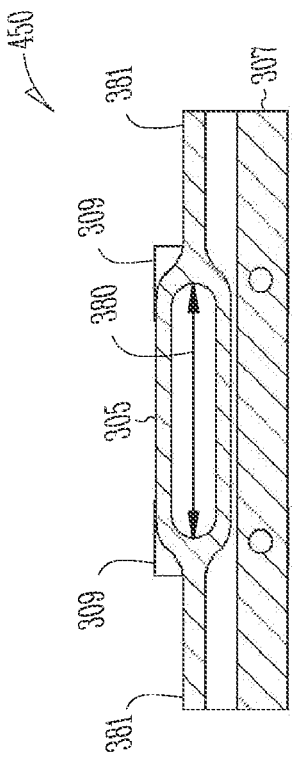
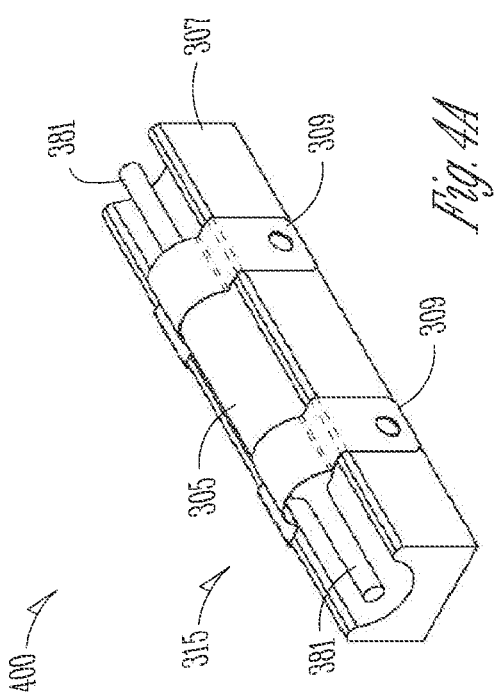
Fig. 4B
Fig. 4C
Fig. 4A ical field US 8,860,323 B2

PLASMA LAMP WITH LUMPED COMPONENTS

RELATED PATENT DOCUMENTS

This patent application claims the benefit of priority of U.S. Provisional Patent Application Ser. No. 61/388,286, filed on Sep. 30, 2010, and U.S. Provisional Patent Application Ser. No. 61/426,958, filed on Dec. 23, 2010, the contents of both applications being incorporated herein by reference in their entirety.

TECHNICAL FIELD

The present disclosure relates to electrodeless plasma lamps. In an example embodiment an electrodeless plasma lamp with lumped components is described.

BACKGROUND

Electrodeless plasma lamps may be used to provide bright, white light sources. Because electrodes are not used, they may have longer useful lifetimes than other lamps. In an electrodeless plasma lamp, radio frequency power may be coupled into a fill in a bulb to create a light emitting plasma.

BRIEF DESCRIPTION OF THE DRAWINGS

The present disclosure is illustrated by way of example, and not limitation, in the figures of the accompanying drawings, in which like reference numerals indicate similar features unless otherwise indicated. In the drawings, FIG. 1 is an example embodiment of an electrodeless plasma lamp;

FIG. 4A illustrates an example embodiment of a bulb assembly;

FIG. 4B is a plan view of the bulb assembly of FIG. 4A;

FIG. 4C is a cross-sectional view of the bulb assembly taken at C-C in FIG. 4B;

DETAILED DESCRIPTION

Figure 1A:
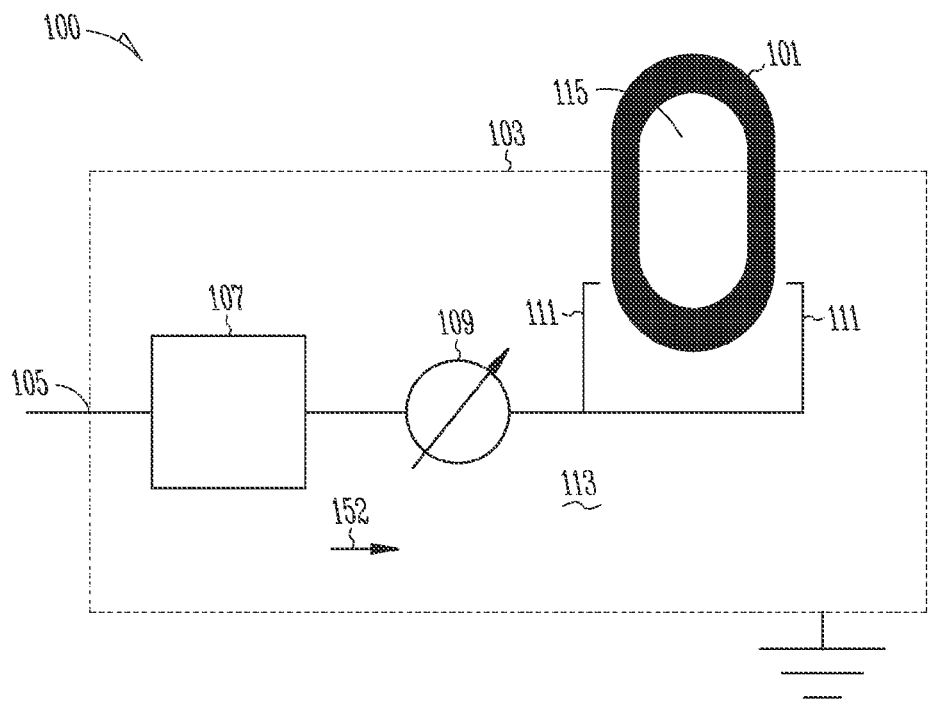
FIG. 1A is a schematic representation of an example embodiment of an electrodeless plasma lamp operating as a single-ended resonator having a single radio frequency (RF) power input port with a long axis of a bulb being normal to an upper surface of a lamp body.

While the inventive subject matter described herein is open to various modifications and alternative constructions, various embodiments shown in the drawings are described herein in detail. It is to be understood, however, there is no intention to limit embodiments of the invention to the particular forms or arrangements disclosed which are provided merely by way of example. On the contrary, it is intended that the inventive subject matter cover all modifications, equivalences, and alternative constructions falling within the spirit and scope of the disclosure as expressed in the appended claims. Like references numerals have been used to indicate the same or similar features unless otherwise indicated.

Designs for electrodeless plasma lamps are presented based on various resonator topological configurations. A resonator accepts electromagnetic energy with a frequency close to its self-resonant frequency, and rejects input energy at other frequencies. The self-resonant frequency is determined by the reactive components of the resonator. Once the energy enters the resonator, it is stored by the reactive elements or components until it is dissipated by the resistive elements or components of the resonator. The energy storage mechanisms are the electric fields inside the resonator capacitors (or equivalent capacitive elements), and the magnetic fields inside the resonator inductors (or equivalent inductive elements). The energy transfers back and forth, from electric energy to magnetic at the frequency of the supplied energy. On each transfer, some energy is lost. Upon transferring from electric energy to magnetic, currents are produced in the inductors that result in ohmic losses. When transferring from magnetic energy to electric, voltages are generated in the capacitors that are used to power the plasma lamp. That is, the plasma lamp is a desirable power loss mechanism. Depending on the exact design, there may be hundreds or even thousands of transfers before the energy decays to less than 1% of its initial value. So the successful operation of a resonator lamp design can be viewed as a race: It is imperative to design the structure such that the lamp or bulb dissipates electric energy more quickly than the inductors dissipate magnetic energy. Resonators are often described in terms of their "Q," or quality factor. Q is the ratio of the energy stored to the power dissipated, multiplied by the angular frequency of the energy:

$$Q = \omega \cdot \frac{\text{energy stored}}{\text{power dissipated}},$$

where ω is the angular frequency of the system. For an operating lamp in which the plasma has formed, the Q should be very low (less than 20) since the bulb dissipates energy quickly. But the lamp might exhibit very high Q (greater than 200) prior to plasma ignition since the power loss mechanism of the bulb does not yet exist.

The various resonator designs discussed herein are configured to accept power (e.g., radio frequency (RF) power) at one or more input ports, and deliver the RF power to a bulb including a fill capable of forming a plasma. Various types of gas fills may be contained within the bulb. When the RF power is provided to the fill, a plasma arc is generated within the bulb through a high electric field produced within the fill. In example embodiments, the RF power causes light-emitting plasma discharge in the bulb. In example embodiments, RF power may be provided at a frequency in the range of between about 10 MHz and about 500 (or higher) or any range included therein. In example embodiments, the RF power may be applied at a frequency or in a range of from 0% to 10% above or below the stated frequency range or any range included therein. In some embodiments, RF power may be applied in a range of from 0% to 5% above or below the frequency range.

In example embodiments, the plasma lamp may be used in entertainment lighting or architectural lighting or other lighting applications. In some examples, the plasma lamp may be used in moving head entertainment fixtures, fixed spot fixtures, architectural lighting fixtures, or event lighting fixtures. Example embodiments may also be used in street and area lighting and other high-output lighting applications. It is however to be appreciated that the use of the plasma lamp is not limited to these example deployments.

Example embodiments of plasma lamps described herein may be fine-tuned to meet governmental and other regulatory requirements for radio frequency operating characteristics. For example, industrial, scientific, and medical (ISM) bands are defined by the International Telecommunications Union (ITU, based in Geneva, Switzerland) to avoid harmful interference between various portions of the RF spectrum such as, for example, between a plasma lamp and FM radio stations. ISM bands are established to give portions of bandwidth to applications using RF technology that are generally recognized as useful to society. ISM devices can radiate freely only within those bands (subject to other health and safety regulations that limit maximum radiated electric and magnetic field intensities), so precise frequency tuning may be necessary to assure compliance with ISM restrictions. If a plasma lamp body is not operating in accordance with the ISM bands, the resonant frequency of the lamp can be tuned as necessary. Various example embodiments of frequency tuning are described herein by way of example.

Example embodiments provide a plasma lamp operable in a frequency range translated down to lower frequencies without requiring excessively large lamp bodies. A target frequency range that enhances (and may optimize) the competing advantages of small resonator size, DC to RF conversion efficiency, and use of ISM bands may be 40 to 80 MHz. An example ISM-designated frequency is 40.68 MHz. Although the overall DC to RF conversion efficiency is approximately the same for either a 40 MHz RF power supply or an 80 MHz supply (both efficiencies may be about 90% or higher), cost advantages may be associated with a 40 MHz power supply.

FIG. 1 illustrates an example embodiment of an electrodeless plasma lamp 300. The plasma lamp 300 is operatively coupled to a power source and is shown, by way of example, to include a conductive enclosure 301, an RF input port 303, a bulb 305, a ceramic carrier 307, and a pair of conductive straps 309. The conductive straps 309 may form conductive applicators that apply power from the conductive enclosure 301 to the bulb 305. In an example embodiment, the conductive enclosure 301 is a parallelepiped and has parallel end walls 330 and 332, parallel sidewalk 334 and 336, and parallel top and bottom walls 338 and 340. The plasma lamp 300 is further shown to include a dielectric volume 313 (e.g., air) within the conductive enclosure 301, a bulb assembly 315, a lumped inductive element in the example form of a ground coil 317, and a pair of ground coil fasteners 319. The plasma lamp 300 of FIG. 1 is shown and described in more detail below with reference to FIG. 3A.

FIG. 1A is a schematic representation of an example embodiment of an electrodeless plasma lamp 100 operating as a single-ended resonator. The plasma lamp 100 is an example only and other plasma tamps may be used with other embodiments, including microwave or inductive plasma lamps. In a specific example embodiment, the plasma lamp 100 may be optimized for low-etendue applications.

The plasma lamp 100 is shown to include an elongate bulb 101, a metal enclosure 103 forming a lamp body, and an RF feed, for example, an input port 105. The bulb 101 is provided within a dielectric cavity 113 of the enclosure 103. The dielectric cavity 113 may comprise a gas such as air or pressurized nitrogen, a liquid, a solid such as ceramic or ceramic powder, or some combination of these. The bulb 101 contains a fill capable of forming a light emitting plasma when power is coupled to the fill. The fill is contained within a bulb cavity 115 of the bulb 101. In one example embodiment, an outer length of the bulb 101 is about 26 mm and an outer diameter (at the center) of the bulb 101 is about 10 mm. In this example, the interior of the bulb 101 (which contains the fill) has an interior length of about 20 mm and an interior diameter (at the center) of about 6 mm. The wall thickness of the bulb 101 is about 2 mm along the sides of the cylindrical portion. The wall thickness at a front end of the bulb 101 is about 3 mm. The wall thickness at the other end is also about 3 mm. In this example, the interior bulb volume is about 0.51 $cm^3$. In example embodiments where power is provided during steady state operation at between about 150 Watts to 500 Watts (or any range included therein), this bulb size results in a power density in the range of about 295 Watts per $cm^3$ to 982 Watts per $cm^3$, or any range included therein. In this example embodiment, the interior surface area of the bulb 101 is about 3.77 $cm^2$, and the wall loading (power averaged over interior surface area) is in the range of about 39.8 Watts per $mm^2$ to 132.6 Watts per $mm^2$, or any range subsumed therein. In other embodiments, the bulb 101 may be smaller or larger, having correspondingly higher or lower wall loadings. In other embodiments, the applied RF power may be scaled by approximately the ratio of the bulb size to that of the present embodiment, in order to maintain similar wall loadings.

The enclosure 103 is electrically conductive (e.g., either metallic or a metallization layer formed over a non-conductive material) and houses the various elements/components of the plasma lamp 100. In an example embodiment, the enclosure 103 uses air as a dielectric material. The electrically conductive nature of the enclosure 103 allows a ground current return path for an applied RF power. The RF input port 105 couples RF power from an RF power supply (not shown) through an input- or impedance-matching network 107, to a phase-shifting element 109 (e.g., a lumped inductive element), to a pair of electrically conductive field applicators 111. In an example embodiment, the input-matching network 107 may be an impedance-tuning element such as a variable capacitor shunt connected to the enclosure 103 between the phase-shifting element 109 and the RF input port 105. In another example embodiment, the input-matching network 107 may be a lumped or distributed capacitance, or a capacitive structure such as a parallel plate. In another example embodiment, the capacitance of matching network 107 may be realized by locating the end of the phase-shifting element 109 in close proximity to, but not touching, the enclosure 103 at one or more points adjacent to the connection point between the phase-shifting element 109 and the RF input port 105. The input or impedance matching network 107 matches an output impedance of the RF power supply to the input impedance (e.g., 50 ohms) of the plasma lamp 100. Matching impedances allows an increased power transfer with a reduced reflection of the input power from the plasma lamp 100.

The phase-shilling element 109 may be, for example, a quarter-wave phase shifter. In certain embodiments, the phase-shifter 109 will supply somewhat less than a quarter-wave shift (90 degrees) because the capacitive loading of the input-matching network 107 and the field applicators 111 each provide some additional phase shift. In practice, the total phase shift of all components between the RF input port 105 and the field applicators 111 is 90 degrees, or an odd multiple of 90 degrees. The quarter-wave phase shifter provides an approximately 9, degree phase shift in power coupled from the RF input port 105 to the electrically conductive field applicators 111. The quarter-wave phase shifter may comprise a lumped inductor; specifically in an example embodiment, a length of conductive wire formed into a coil having an air core. The coil wire may be solid or hollow, and may be coated with a variety of materials. Hollow coils reduce weight without impacting performance since RF currents only flow near the surface of conductors due to the skin effect. Coils may be coated with various plated metals, such as copper, silver, gold, or platinum-group metals. Coils may also be coated with various temperature-stable insulating materials, such as metal oxides, polyimide resins, or ceramics or ceramic powders. For a quarter-wave phase shifter, the total length of the conductive wire is approximately the wavelength ($\lambda$) of the RF input power divided by a factor of four. For example, for an input frequency of 40.68 MHz, $\lambda$ is approximately equal to 7.37 meters in free air. Thus, the length of the conductive wire that forms the coil is approximately 7.37 meters/4 or 1.84 meters in an air cavity. The linear extent of the phase-shifting element 109 may be significantly less than 1.84 meters if the length of wire is wound into a coil. In other example embodiments, the inductor coil may be wound into an irregular shape. For example it may have a non-circular cross section, such as an oval or square. It might have other irregular features, such as radius or winding pitch that vary along the length of the inductor. In some example embodiments, the inductor may comprise a multi-layer coil, having some turns wound on a first, smaller radius, and some turns wound on a second, larger radius. In other example embodiments, the inductor may not be wound into a coil; instead the wire might be straight or bent in one or more locations to achieve a desired arbitrary shape. In other example embodiments, the phase-shifting element 109 may be a stripline or other TEM waveguide.

In an example embodiment shown in FIG. 1A, the pair of electrically conductive field applicators 111 comprises metallic RF feeds that extend transverse to the length of the phase-shifting element 109 and are placed in proximity to the bulb 101, thereby placing the bulb 101 within a generated electric field. The generated electric field is discussed, by way of example, in more detail with reference to FIGS. 1D and 1E, below. The RF power is coupled to the fill in the bulb 101 to form the light-emitting plasma. The transverse orientation of the field applicators 111 is such that the RF power enters the enclosure 103 along a first axis and light exits the enclosure 103 along a second axis approximately normal to the first axis. This orientation may be used to satisfy application-level design constraints, such as limited available space along the optical (second) axis. If space is limited on this axis, then there may not be room in the target application to accommodate the length of the phase-shifting element 109. Therefore, the phase-shifting element 109 may be located along its alternate axis.

Figure 1B:
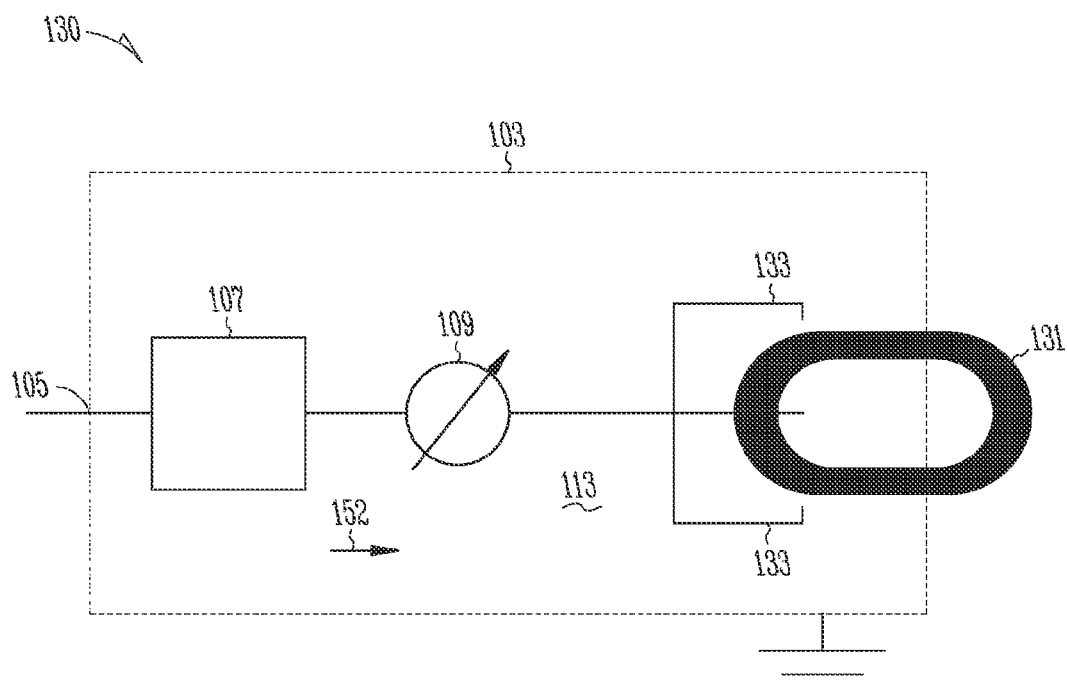
FIG. 1B is a schematic representation of an example embodiment of an electrodeless plasma lamp operating as a single-ended resonator having a single RF power input port with the long axis of a bulb being normal to a side face of a lamp body.

FIG. 1B is a schematic representation of an example embodiment of an electrodeless plasma lamp 130 operating as a single-ended resonator. In this embodiment, a pair of electrically conductive field applicators 133 is aligned with a teed and a bulb 131. The bulb 131 is arranged such that the long axis of the bulb 131 is normal to a side face of the enclosure 103 of plasma lamp 130. The longitudinal orientation of the field applicators 133 is such that the RF power enters the enclosure 103 along a first axis, and light exits the enclosure 103 along a second axis approximately parallel (or aligned with) to the first axis. This orientation may be used to satisfy application-level design constraints, such as limited available space along the radial dimension. If space is limited radially, then there may not be room in the target application to accommodate the length of the phase-shifting element 109 except along the optical axis.

In the example plasma lamp 100 of FIG. 1A, the long axis of the bulb 101 is shown to be substantially normal to an upper surface of the enclosure 103. Depending upon physical mounting and space considerations for a plasma lamp, each orientation of the bulb 101 may have a higher output or longer life, or both. For example, plasma lamps may operate with a bulb temperature in the range of approximately 1000° C. to 1200° C. Due to the elevated operating temperature, thermal buoyancy forces act on the gas fill and generated plasma within the bulb causing the gases/generated plasma to rise toward an uppermost portion of the bulb. Consequently, the light output from the bulb tends to be higher on the upper surfaces of the bulb. An effect of the thermal buoyancy forces on lamp output is discussed, by way of example, in more detail, below.

Figure 1C:
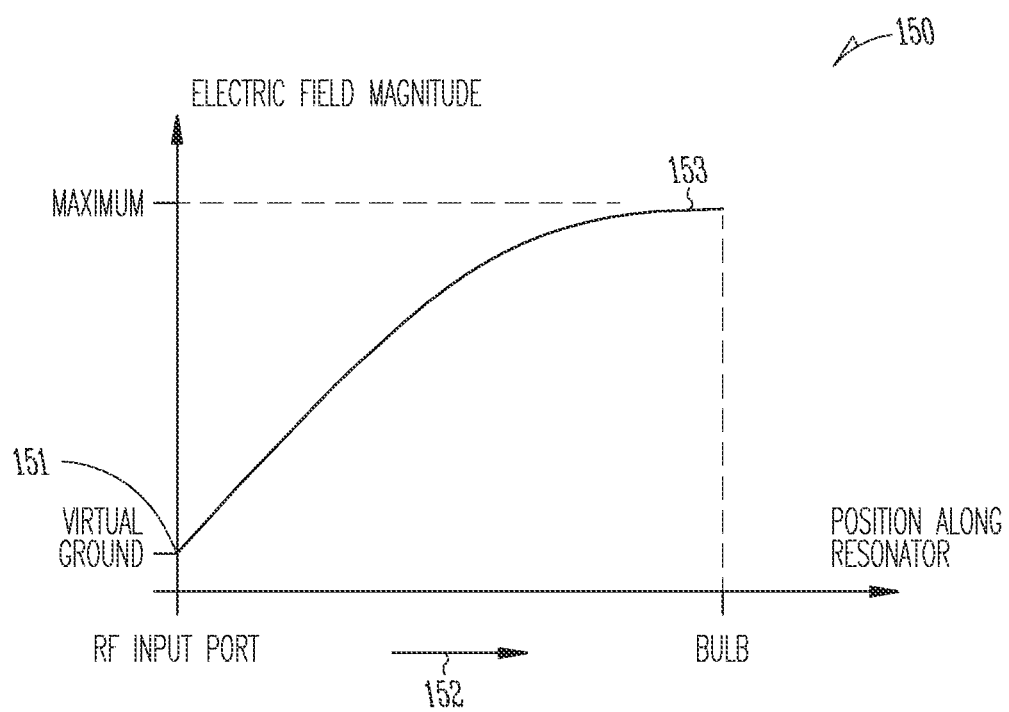
FIG. 1C is a graph indicating electric field magnitude as a function of distance along a resonator from an RF input port to a bulb for the plasma lamps of FIGS. 1A and 1B.

FIG. 1C is a graph 150 indicating electric field magnitude as a function of distance along the resonator from the RF input port 105 to the bulbs 101, 131 for the example plasma lamps 100, 130 of FIGS. 1A and 113. The electric field magnitude graph 150 is similar with reference to either of the plasma lamps of FIG. 1A or 1B. At the RF input port 105, the electric field magnitude is near 0 as shown at 151, the magnitude depending on how closely the input-matching network 107 ties the RF power to ground. Thus, in an example embodiment, the indication of "virtual ground" is a node where the RF input is coupled to a terminal of an input capacitor that is opposite that of the terminal of the capacitor coupled to ground. As the position along the resonator increases through the phase-shifting element 109 (see arrow 152), the electric field reaches a maximum 153 at the pair of electrically conductive field applicators 111, 133 near the bulb 101, 131.

The example plasma tamps of either of FIG. 1A or FIG. 1B are quasi λ/4, (or quarter wavelength) standing wave designs along the length of the resonator as indicated by the electric field magnitude graph 150 of FIG. 1C. The phase-shifting element 109 may provide the necessary electrical length to generate the standing wave at the design frequency. The λ/4 phase shift (or 90°) may only be approximate, hence the quasi-λ/4 standing wave. The "quasi" designator is due to capacitive loading at the bulb end, and the virtual ground at the input end. The bulb 101, 131 and the field applicators 111, 133 provide capacitive loading to the open-circuit end of the resonator. The capacitive loading is known to add some inherent phase shift, thus shortening the required shift from the phase-shifting element 109. The total phase shift may also be truncated slightly by the input virtual ground. If the input were at true ground, the input impedance would be zero, and it would be impossible to deliver power to the resonator (that is, the RF power supply would be shorted). The input-matching network 107 may thus provide a low, but non-zero, impedance to ground. The input impedance should be low enough to support the quasi-λ/4 mode, but high enough (e.g., 50Ω) the input port may be matched to an RF power delivery circuit.

The electric field configuration for the plasma lamp shown in either of FIG. 1A or FIG. 1B is fundamentally unbalanced because an electromagnetic field extends between the field applicators 111 and the enclosure 103. One side of the electromagnetic circuit is thus ground. In an example embodiment, the grounded side of the field applicator 111 is at such low impedance over such a wide surface area that it does not support a localized attachment of the electric field. The powered side of the field applicator 111 supports a concentration of field lines at its most extreme end, where the distance to the grounded side is at a minimum. This tends to produce stronger electric fields, and may support higher plasma densities concentrated at the powered side of the field applicator 111.

Figure 1D:
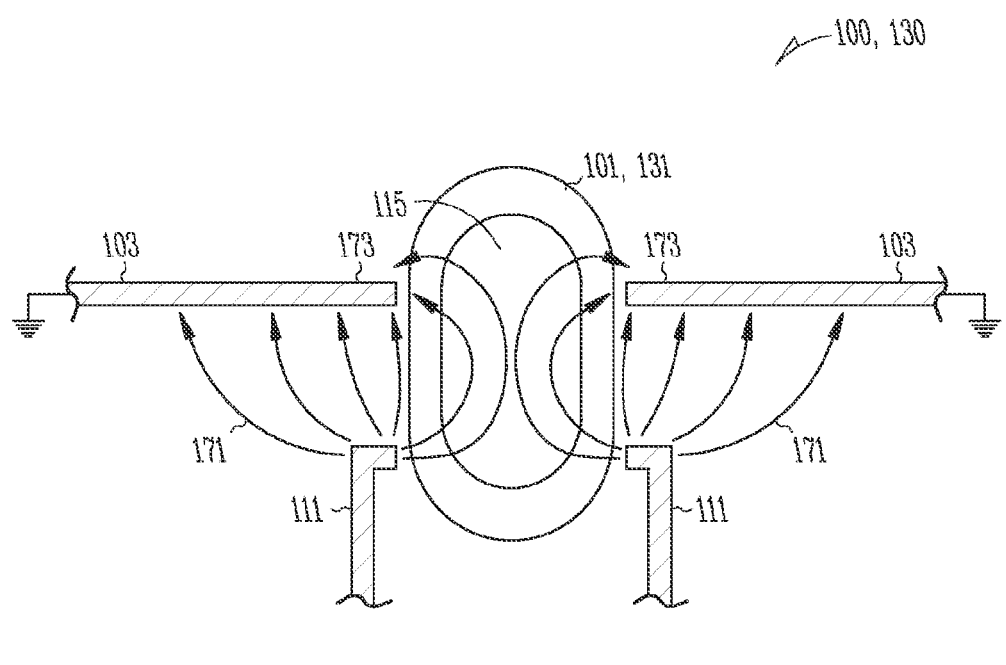
FIG. 1D is an illustration of example electric field lines prior to ignition of a plasma for the plasma lamps of FIGS. 1A and 1B.

FIG. 1D is an illustration of example electric field lines 171 prior to ignition of the plasma for the plasma lamps 100, 130 of FIGS. 1A and 1B. The electric field lines 171 are formed after RF power has been supplied to the plasma lamp 100, 130, but prior to a plasma being formed within the bulb 101, 131. Prior to ignition/formation of the plasma in the bulb 101, 131, the electric field lines 171 are shown to extend through the bulb cavity 115. As shown, the electric field lines 171 extend from the pair of electrically conductive field applicators 111, through the bulb 101, 131, and toward portions of walls 173 of the enclosure 103 that are proximate the bulb 101, 131.

Figure 1E:
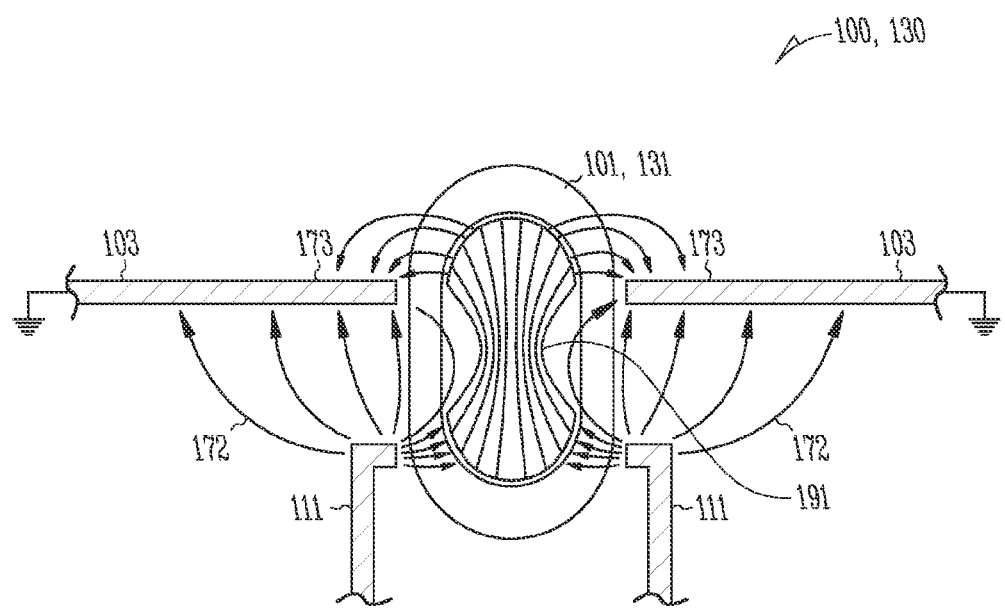
FIG. 1E is an illustration of example electric field lines once the plasma is generated within the bulb of the plasma lamps of FIGS. 1A and 1B.

FIG. 1E is an illustration of electric field lines 172 once a plasma is formed within the bulb 101, 131 of the plasma lamps of FIGS. 1A and 1B. The electric field lines 172 are formed after RF power has been supplied to the plasma lamp 100, 130, and after a plasma has been generated within the bulb 101, 131. After ignition, the electrically conductive plasma partially excludes the applied field through the skin effect phenomenon, and the resulting electric field patterns are slightly different. Once the plasma current 191 is struck inside the bulb 101, 131, the electric field magnitude inside the plasma is substantially reduced because the plasma resistance is very low. When the plasma is not present, its resistance is infinite (open circuit), and the resistance of the plasma may range from a few Ohms to a few hundred Ohms, depending on its temperature profile and chemical composition. The electric field lines 172 attach to the conductive plasma current 191 more or less perpendicularly at the edge of the plasma, since it is electrically conductive. Unlike the pre-ignition electric field (see FIG. 1D), the post-ignition field delivers real power to the bulb 101, 131, concentrating it in the plasma. The power creates a temperature profile in the plasma due to ohmic self-heating of the plasma current 191. The pre-ignition electric field supplies voltage for initiating the plasma through the Townsend avalanche breakdown, but does not supply any real power since there are no resistive elements present.

Figure 2A:
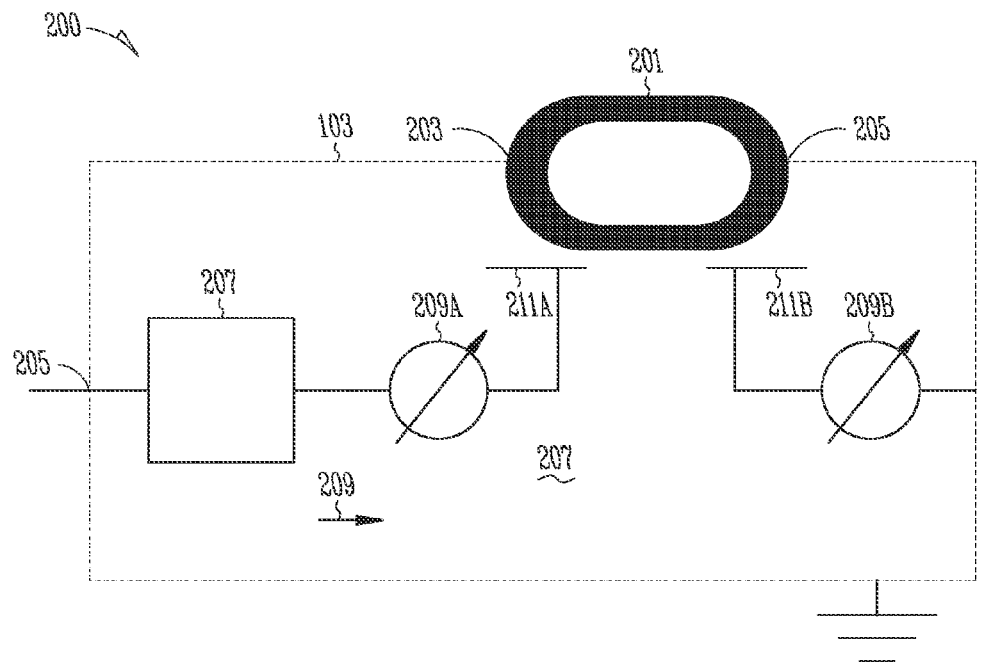
FIG. 2A is a schematic representation of an example embodiment of an electrodeless plasma lamp operating as a single-ended balanced resonator having a single RF power input port and a separate ground connection.

FIG. 2A is a schematic representation of an example embodiment of an electrodeless plasma lamp 200 operating as a single-ended balanced resonator having a single RF power input port and a separate ground connection. The plasma lamp 200 is shown to include a first phase-shifting element 209A (that may be substantially similar to the phase-shifting element 109), a second phase-shifting element 209B (that may be substantially similar to the phase-shifting element 109), a first field applicator 211A, a second field applicator 211B, and a bulb 201 positioned at least partially within an air cavity 207 of the enclosure 103. The bulb 201 may be similar to the bulb 101 of FIG. 1A, discussed above. However, unlike the configuration in FIG. 1A and FIG. 1B where the two field applicators 111A and 111B are at the same potential, the two field applicators 211A and 211B are not directly connected. Additionally, the bulb axis is oriented parallel to an upper surface of the enclosure 103. This bulb orientation is made possible by the specific electric field configuration that arises from having two field applicators 211A and 211B at opposing non-ground potentials. Each of the first and second phase-shifting elements, 209A and 209B respectively, may be an inductor, a stripline, or a TEM waveguide, as described above. The nominal phase shift of each element 209A, 209B is one quarter wave (λ/4 or 90°). In an example embodiment each phase-shifting element 209A, 209 B may generate an equal or an unequal phase shift with respect to one another. As shown by way of example, the second phase-shifting element 209B may be coupled to the second field applicator 211B and to the enclosure 103 (which is grounded). In example embodiments, the RF power is coupled at a frequency that forms a standing wave primarily within the first and second phase-shifting elements 209A, 209B. Example embodiments, based on the single-ended balanced design, are described, by way of example, with reference to FIGS. 3A through 3E, below.

Figure 2B:
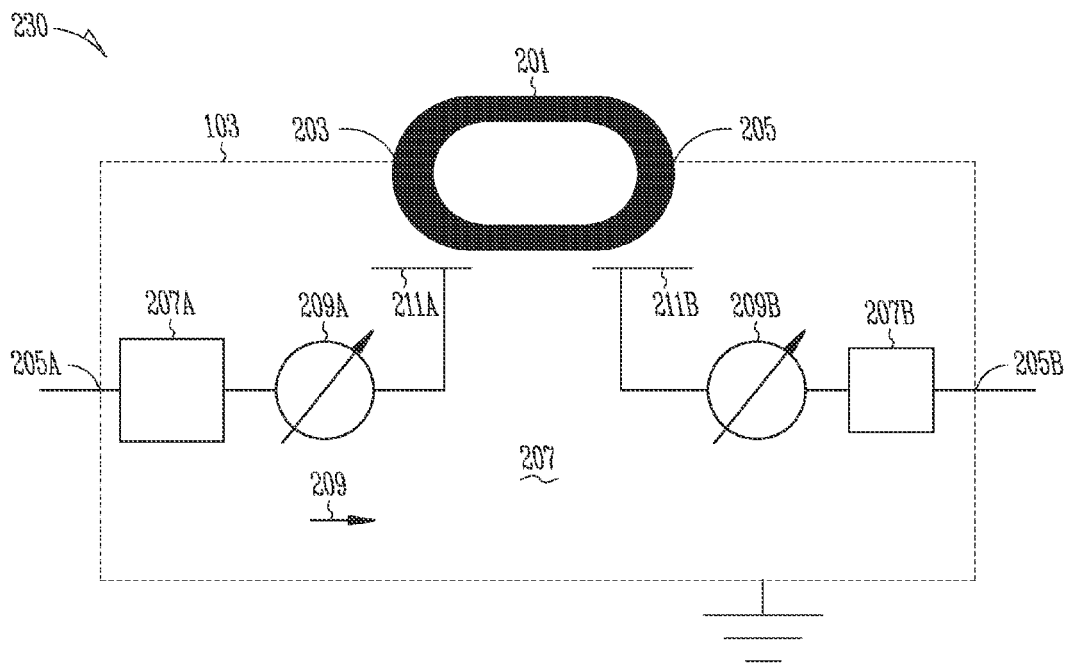
FIG. 2B is a schematic representation of an example embodiment of an electrodeless plasma lamp operating as a double-ended balanced resonator with dual RF power input ports without a separate ground connection.

FIG. 2B is a schematic representation of an example embodiment of an electrodeless plasma lamp 230 operating as a double-ended balanced resonator with dual RF power input ports without a separate ground connection. The plasma lamp 230 is shown to include a first RF input port 205A (that may be substantially similar to the port 105), a second RF input port 205B (that may also be substantially to the port 105), a first input-matching network 207A (that may be substantially similar to the input-matching network 107), and a second input-matching network 207B (that may also be substantially similar to the input-matching network 107). The first and the second input-matching networks 207A, 207B match an output impedance of the RF power supply to the input impedance at the first and the second RF input ports 205A, 205B. As with the example resonator designs discussed above, the first and the second input-matching networks 207A, 207B may be capacitance coupled in parallel to ground between the first and second phase-shifting elements 209A, 209B and the first and second RF input ports 105A, 105B. In example embodiments, the first and the second input-matching networks 207A, 207B may be a lumped or distributed capacitance, or a capacitive structure such as a parallel plate.

In this example embodiment, RF power applied to the first and the second RF input ports 205A, 205B is assumed to be 180° out-of-phase with respect to each other. Therefore, the first and the second phase-shifting elements 209A, 209B are arranged to deliver RF power to each end of the bulb 201 that is 180° out-of-phase with respect to the other end. For example, the first field applicator 211A may present RF power to the bulb 201 at +90° while the second field applicator 211B presents RF power to the bulb 201 at −90°. This phase inversion is explained, by way of example, with reference to FIG. 2C, below.

The resonant mode for the plasma tamps 200, 230 of FIGS. 2A and 2B each includes, in example embodiments, two oppositely polarized quasi-λ/4 sections (although as noted above, each section may be more or less than λ/4). As with the plasma lamps 100, 130 of FIGS. 1A and 1B, in the plasma lamps 200, 230 the bulb 201 and the first and second field applicators 211A, 211B provide capacitive loading that reduces the required phase shift to support the quasi-λ/4. The first and second input-matching networks 207A, 207B provide virtual ground at either input port 205A, 205B. In the case of FIG. 2B where there are first and second RF input ports 205A, 205B, the RF power is supplied at each input port 205A, 205B with a 180° phase difference to the other port. In the dual input configuration of FIG. 2B, the input impedance at each input port 205A, 205B does not have to be the same. The electric field configuration for the plasma tamps 200, 230 of FIGS. 2A and 2B is balanced because of the electric field symmetry along the length of the bulb 201. Neither the first nor the second field applicator 211A, 21 has a potential near ground, so both applicators 211A, 211B support a symmetrical concentration of field lines. Each of the plasma lamps 200, 230 of FIGS. 2A and 2B may be employed in high-output applications, such as street lighting.

Figure 2C:
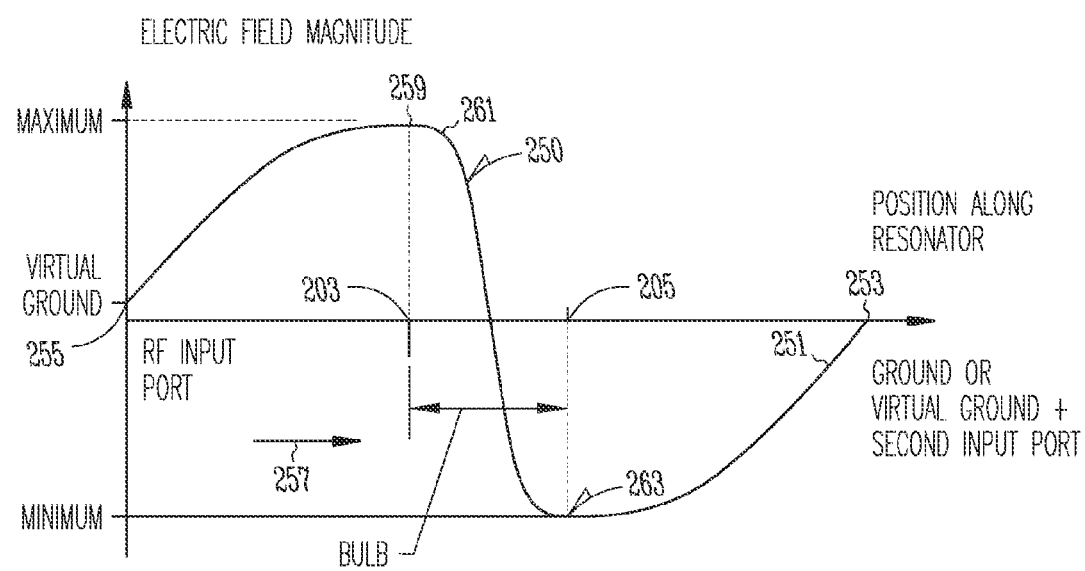
FIG. 2C is an illustration indicating example electric field magnitude as a function of distance along the resonator from an RF input port to a bulb to either a ground or a virtual ground for the balanced resonator plasma lamps of FIGS. 2A and 2B.

FIG. 2C is an illustration indicating electric field magnitude 250 (vertical axis) as a function of distance (horizontal axis) along the resonator from the RF input port to a bulb to either ground or virtual ground for the balanced resonator plasma lamps 200, 230 of FIGS. 2A and 2B. In particular, the electric field magnitude 250 shows a maximum electric field output as a function of distance from the first RF input port 205A to the bulb 201, and from the bulb 201 to a distal side of the second phase-shifting element 209B. (The distal side may be either at ground, as shown in FIG. 2A, or at virtual ground, as shown in FIG. 2B.) As shown at 255, at the first RF input port 105A, the electric field magnitude 250 is near 0, the exact magnitude 250 depending on how closely the input-matching network 207 of FIG. 2A, or the first input-matching network 207A of FIG. 2B, ties the RF power to ground. Thus, in a specific example embodiment, the indication of "virtual ground" is anode where the RF input port is coupled to a first terminal of an input capacitor with the other terminal of the capacitor being coupled to ground. As the position along the resonator increases through the first phase-shifting element 209A (see arrow 257), the electric field reaches a maximum 259 at the first field applicator 211A. At a first end 203 of the bulb 201, the electric field magnitude 250 begins to drop based on a voltage drop across the bulb 201 (see arrow 261). The particular voltage drop depends on the specific capacitance between the field applicators 211A, 211B, and the plasma, as well as the plasma impedance. The plasma impedance is given by the plasma current, $i_{plasma}$, through the bulb 201 during operation, multiplied by a resistance of the bulb 201, $R_{plasma}$. At the second end 205 of the bulb 201, the electric field magnitude 250 is at a minimum (see arrow 263) and increases to near 0 at a first point 251 (at virtual ground of the second RF input port 205B of the plasma lamp 230 of FIG. 2B), or to 0 at a second point 253 at the enclosure 103 of the plasma lamp 200 of FIG. 2A.

Figure 2D:
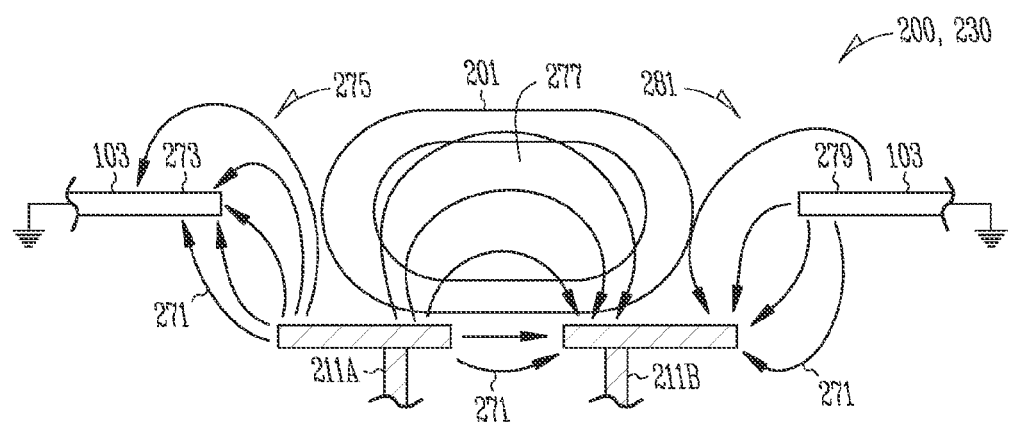
FIG. 2D is an illustration of electric field lines prior to ignition for the balanced resonator plasma lamps of FIGS. 2A and 2B.

Referring to FIG. 2D, an illustration showing of electric field lines 271 prior to ignition of the plasma of the balanced resonator plasma lamps 200, 230 of FIGS. 2A and 2B. The electric field lines 271 are formed after RF power has been supplied to the plasma lamp 200, 230, but prior to a plasma being formed within the bulb 201. The electric field lines 271 extend from the first field applicator 211A to either an adjacent portion 273 of the enclosure 103 (see also arrow 275), or through the bulb 201 to the second field applicator 211B (as generally indicated by arrow 277). Additionally, the electric field lines 271 extend from a portion 279 of the enclosure 103, to the second field applicator 211B (see also arrow 281).

Figure 2E:
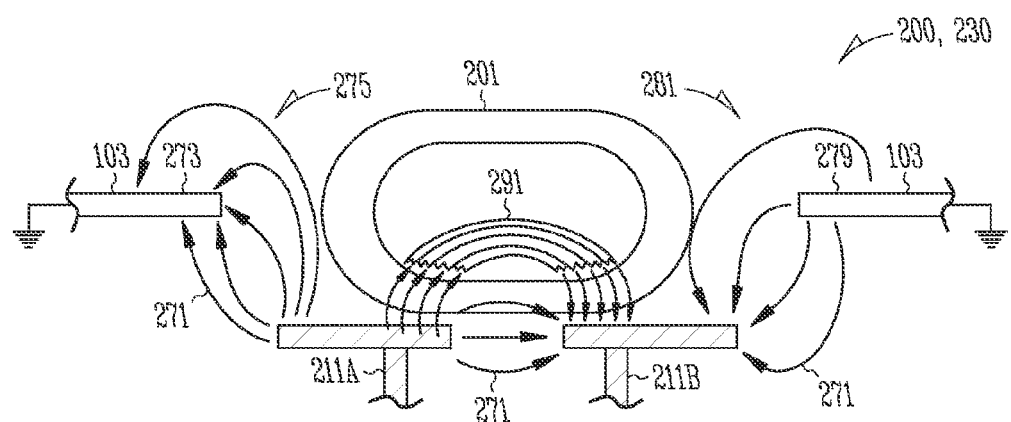
FIG. 2E is an illustration of electric field lines once a plasma is generated within the bulb of the balanced resonator plasma lamps of FIGS. 2A and 2B.

FIG. 2E is an illustration of the electric field lines 271 once a plasma is generated within the bulb 201 of the balanced resonator plasma lamps 200, 230 of FIGS. 2A and 2B. The electric field lines 271 extend from the first field applicator 211A to either a portion 273 of the enclosure 103 (see also arrow 275), or through the bulb 20) to the second field applicator 211B (as generally indicated by arrow 277). Additionally, the electric field lines 271 extend from a portion 279 of the enclosure 103, to the second field applicator 211B (see also arrow 281). After ignition, the electrically conductive plasma partially excludes the applied field through the skin effect phenomenon, and the resulting electric field patterns are slightly different. Once the plasma current 291 is struck inside the bulb 201, the electric field magnitude inside the plasma is substantially reduced because the plasma resistance is very tow. When the plasma is not present, its resistance is infinite (open circuit), and the resistance of an ignited plasma may range from a few Ohms to a few hundred Ohms, depending on its temperature profile and chemical composition. The electric field lines 271 attach to the conductive plasma current 291 more or less perpendicularly at the edge of the plasma, since it is electrically conductive. Unlike the pre-ignition electric field (see FIG. 2D), the post-ignition electric field delivers real power to the bulb 201, concentrating it in the plasma. The power creates a temperature profile in the plasma due to ohmic self-heating of the plasma current 291. The pre-ignition electric field supplies voltage for initiating the plasma through the Townsend avalanche breakdown, but does not supply any real power since there are no resistive elements present. Since the electric field is applied to this bulb 201 primarily from one side (as opposed to the designs presented in FIGS. 1A and 1B, where the field is applied uniformly around the bulb's circumference), the plasma assumes a non-axisymmetrical arch-shape. Thermal buoyancy effects heavily influence the shape of the plasma.

Figure 3A:
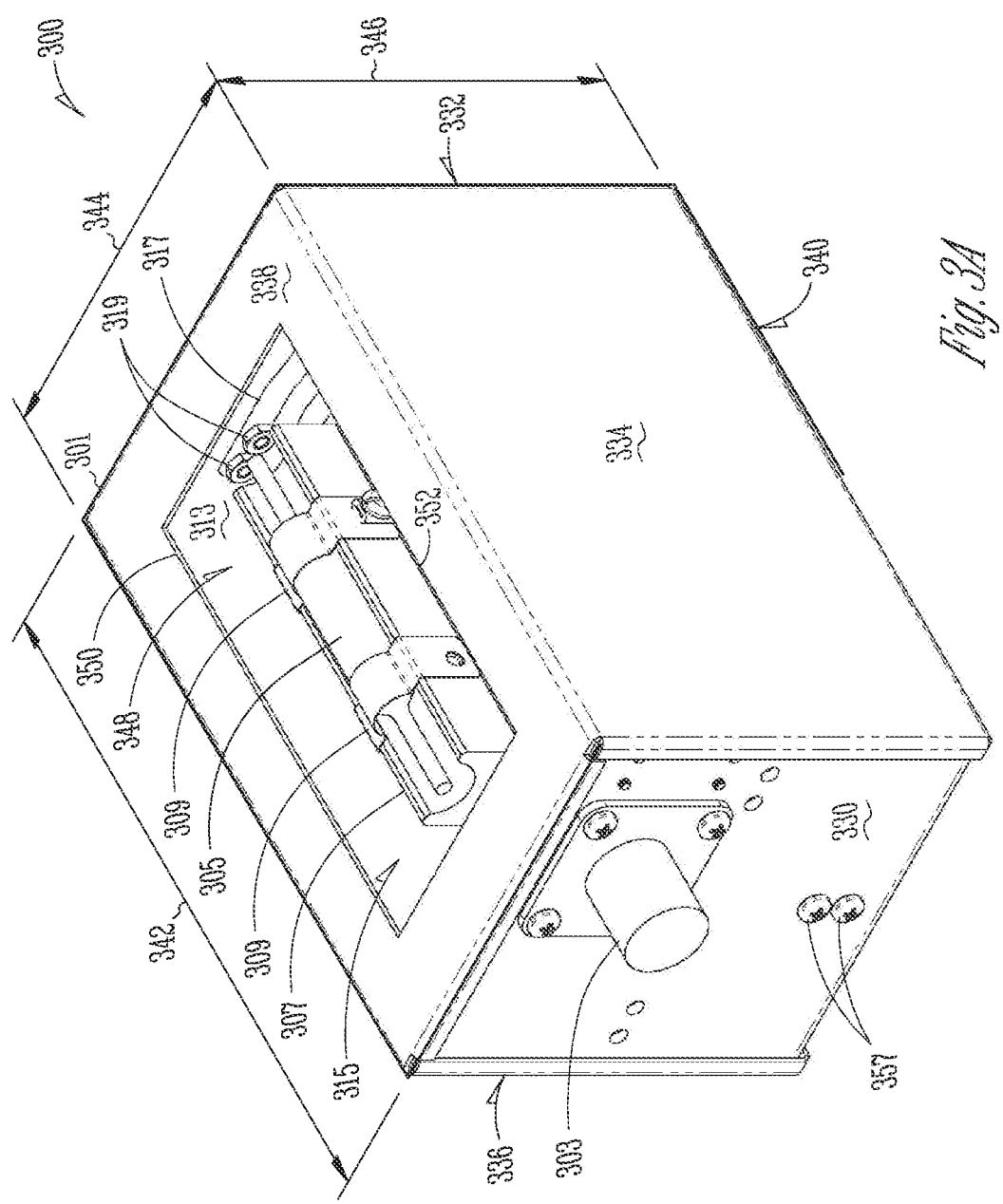
FIG. 3A is a three-dimensional view of the plasma lamp of FIG. 1 showing dimensional details.

FIG. 3A is a three-dimensional view of the plasma lamp of FIG. 1 showing dimensional details. The plasma lamp 300 may substantially resemble the plasma lamp 200 of FIG. 2A. The plasma lamp 300 is operatively coupled to a power source and is shown, by way of example, to include a conductive enclosure 301, an RF input port 303, a bulb 305, a bulb support arrangement such as a ceramic carrier 307, and a pair of conductive elements or straps 309. In an example embodiment, the conductive enclosure 301 is a parallelepiped and has parallel spaced end walls 330 and 332, parallel spaced sidewalk 334 and 336, and parallel spaced top and bottom walls 338 and 340. The plasma lamp 300 is further shown to include a dielectric volume 313 within the conductive enclosure 301, a bulb assembly 315, a ground coil 317, and a pair of ground coil fasteners 319.

As further mentioned above, in an example embodiment the conductive enclosure 301 defines an air-filled resonator cavity and may also serve a variety of other functions. For example, the conductive enclosure 301 functions as an EMI constraint or shield, thus limiting an amount of EMI emitted from the enclosure 301. Additionally, the conductive enclosure 301 serves to conduct ground return current from the ground coil 317. The conductive enclosure 301 can be fabricated from a number of different conductive materials such as aluminum or stainless steel (or any other suitable conductive material). Additionally, since the RF current skin depth is relatively shallow depending on frequency, the walls 330, 332, 334, 336, 338, and 340 of the conductive enclosure can be relatively thin. Accordingly, the conductive enclosure 301 can be constructed from a non-conductive material with a conductive coating or plating formed or otherwise deposited thereon. The conductive enclosure 301 can be fabricated in a variety of ways such as, for example, a deep drawn box, a U-shaped sheet metal with appropriate channel bends for the end components, cast material (e.g., cast aluminum), or a variety of other forming techniques known independently to a skilled artisan. Any seams may be soldered, braised, welded, adhered with conductive epoxy, or a variety of other attachment or sealing methods to limit EMI radiation emitted from the conductive enclosure 301. The top wall 338 may define an enclosure cover that can be, for example, formed or stamped and screwed, welded, or otherwise conductively adhered to the walls 330, 332, 334 and 336. In an example embodiment, the dielectric volume 313 within the conductive enclosure 301 may be filled with air. In other embodiments, the dielectric volume 313 may be filled with solid, powdered, or fluid dielectrics. Many types of dielectric materials are known independently in the art.

In an example embodiment, the conductive enclosure 301 may have a length 342 of between 60 millimeters and 200 millimeters, a width 344 of between 40 millimeters and 200 millimeters, and a height 346 of between 40 millimeters and 200 millimeters. In some example embodiments, the length 342 is 130 mm, the width 344 is 80 mm and the height 346 is 80 mm, defining a rectangular box with square end walls 330, 332. Although shown, by way of example, as rectangular in shape, other shapes include, for example, square, cylindrical, and spherical enclosures. For example, walls 330, 332, 334, 336, 338, and 340 of the conductive enclosure 301 can be approximately 3 mm to 4 mm thick, although an exact thickness can be determined based on structural integrity required for a given application. The overall size of the conductive enclosure 301 can be varied depending upon a number of factors including interior inductor design and bulb size.

The top wall 338 has an opening 348 (e.g., a rectangular opening) with longitudinal edges 350, 352 that are spaced a minimum distance from the pair of mounting members or conductive straps 309 to prevent arc over from the conductive straps 309 to the top wall 338. Arcing may also be prevented using other techniques. The conductive straps 309 may have an applied voltage from RF discussed below, of approximately 2000 volts (as measured strap-to-strap). In an example, the distance may be between 2 millimeters and 20 millimeters for an applied voltage of between 100 volts and 10 kilovolts. The opening 348 may be sized to enhance the amount of light exiting the plasma lamp 30A.

In an example embodiment, the ceramic carrier 307 defines an example seat or support in which the bulb 305 is received. Further details of the example ceramic carrier 307 are provided below with reference to FIGS. 4A through 4D. In an example embodiment, the ceramic carrier 307 may have insulating formations that wrap over or cover the conductive straps 309 to reduce the possibility of arc over.

The bulb assembly 315 may comprise the bulb 305, the ceramic carrier 307, and the pair of conductive straps 309. The bulb 305 may be similar to the bulbs 101, 131, and/or 201 discussed with reference to FIG. 1A or 2A. Details of other example embodiments of the bulb 305 are described, below, with reference to FIG. 4A. The ceramic carrier 307 that supports the bulb 305 may also serve as a heat sink or a diffuse scattering reflector to reflect light from the bulb 305 out of the plasma lamp 300. The ceramic carrier 307 may be formed from various materials that are at least partially thermally conductive and capable of reflecting at least visible light. One such material that can be used to form the ceramic carrier 307 is alumina ($Al_2O_3$). The bulb assembly 315 is discussed in more detail below, by way of example, with reference to FIGS. 4A through 4D. The pair of conductive straps 309 is discussed in more detail, by way of example, with reference to FIGS. 5B and 5C.

Figure 3B:
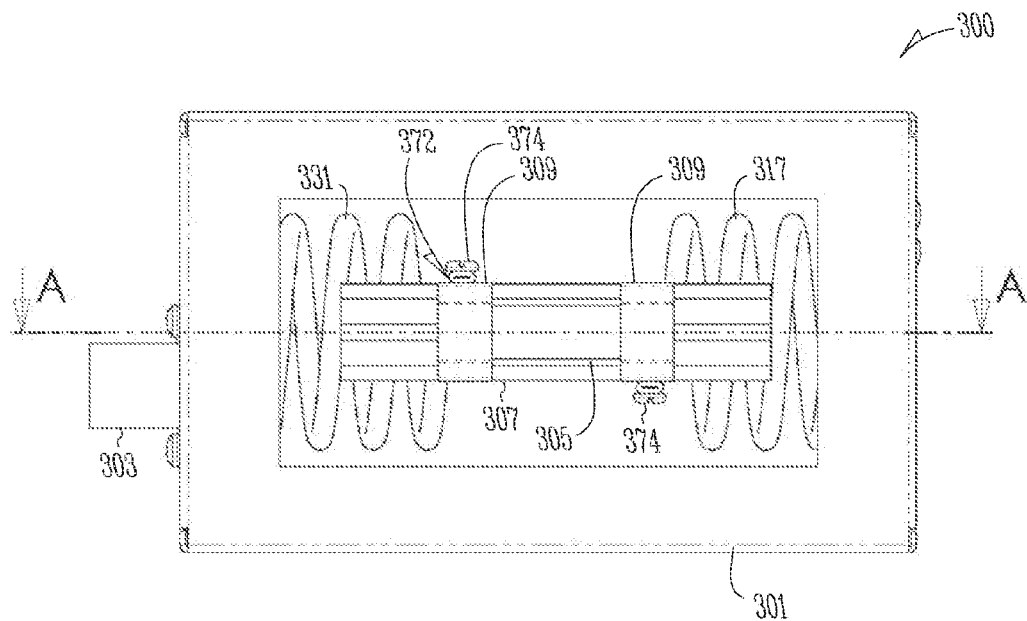
FIG. 3B is a plan view of the plasma lamp of FIG. 3A.

FIG. 3B is a plan view of the plasma lamp 300 of FIG. 3A. The plasma lamp 300 is shown to include an RF input coil 331. The RF input coil 331 is disposed within an air-cavity formed by the conductive enclosure 301 and functions as a partial quarter-wave phase shifter. The RF input coil 331 may comprise of a length of conductive wire formed into a coil; specifically, in an example embodiment, an inductive coil having an air core and functioning as a lumped element is provided. The lumped element allows electric or magnetic energy to be concentrated in it at specified frequencies, and inductance or capacitance may therefore be regarded as concentrated in rather than distributed over the length of the line.

Due to capacitive coupling effects from both an input-matching network (e.g., see input-matching network 207 in FIG. 2A) on a first end 351 (see FIG. 3C) of the RF input coil 331 and to the conductive straps 309 on a second end 372, the actual length of the coil 331 may be somewhat shorter than λ/4. The coil dimensions are typically derived from an estimate of the required inductance. The necessary inductance to produce resonance at a particular frequency may be calculated based on estimated values for the plasma resistance, and also the coupling capacitance between the field applicators (e.g., the conductive straps 309) and the plasma formed in the bulb 305. Once an inductance value is calculated, the coil dimensions may be calculated simply from a number of widely available empirical formulas. One of the most popular formulas for air-core cylindrical coils is $L = r^2 n^2/(9r+10l)$, where L is the inductance in microhenries, r is the coil outer radius in inches, n is the number of turns, and l is the total coil length. In one example embodiment, operating at 80 MHz, the relevant parameters are r=22 millimeters (0.866 inches), l=40 millimeters (1.575 inches), and n=4, for a total inductance of 0.51 microhenries (510 nanohenries). In this particular embodiment, identical coils are used for both the input coil 331 and a grounded coil 317. Although in other example embodiments, the two coils or inductors may have different inductance values. In some example embodiments, the inductors may be realized by different geometries, for example a straight wire for the input inductor, and a coil for the ground inductor. In example embodiments, coil inductances may range from 5 nanohenries to 5000 nanohenries (5 microhenries) or any value between, depending on the desired operating frequency. The coil radius may range from 2 millimeters to 60 millimeters. The overall coil length may range from 10 millimeters to 200 millimeters, again depending on the required inductance. The number of turns can be high to maximize inductance without, for example, requiring a large coil radius. The above formula for inductance does not include self-resonant effects of coil geometry. For a very tightly wound coil (very high 'n'), the capacitance between adjacent turns can be significantly large that it creates a self-resonance within the coil at or below the intended operating frequency of the lamp. In example embodiments, this condition is to be avoided, and self-resonance in coils typically needs to be identified empirically by building and measuring characteristics of various coil designs, including the loading effects of the conductive shielding around the coil. An example input-matching network is described below, by way of example, with reference to FIG. 3D. The ground coil 317 may be fabricated similarly to the RF input coil 331. Each of the coils 331, 317 may be electrically connected to the bulb assembly 315 in a variety of different ways as discussed below. In the example embodiment of FIG. 3B, the coils 331, 317 are electrically connected to the bulb assembly 315 by a set of screws 374.

Figure 3C:
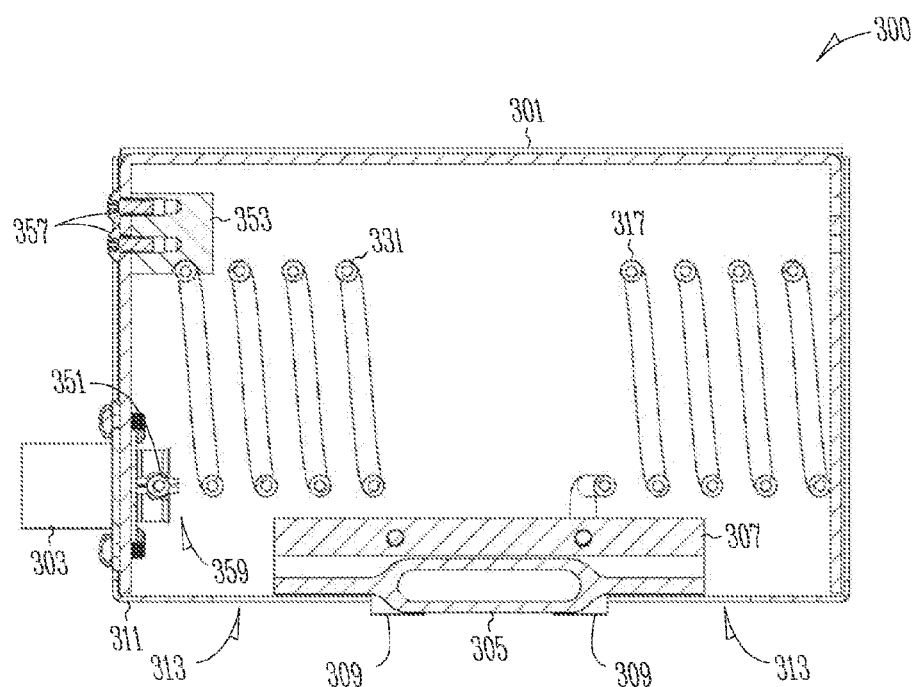
FIG. 3C is a cross-sectional view of the plasma lamp taken at A-A in FIG. 3B.

In FIG. 3C is a cross-sectional view of the lamp 300 taken at A-A in FIG. 3B. The lamp 300 is shown to include the coil attachment point 351 to the RF input port 303 where the coil 331 is coupled to the RF input port 303 via an impedance matching network 359. Optionally, an RF input coil support 353 is provided. The RF input coil support 353 provides structural support for the RF input coil 331 and can be formed from any non-conductive material such as Teflon® or other fluoropolymer resins, Delrin®, or a variety of other materials known independently in the art. The coil support 353 is mounted, by way of example, to the conductive enclosure 301 by mounting screws 357. Although not shown, the ground coil 317 could also be similarly supported.

Figure 3D:
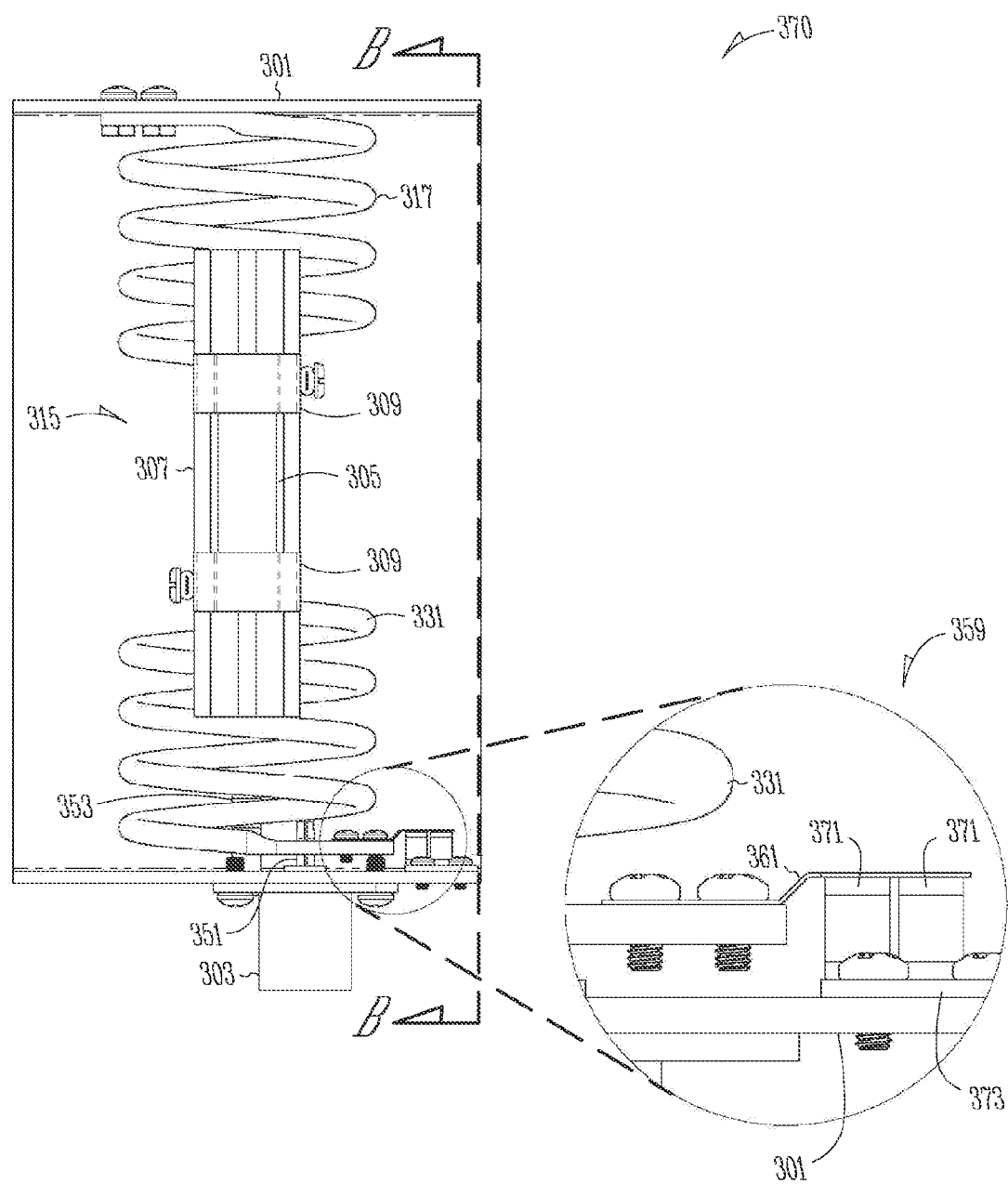
FIG. 3D is a plan view of the plasma lamp of FIG. 3A with a top wall removed showing an exploded view of an example impedance matching network.

With reference to FIG. 3D, a plan view of the lamp 300 of FIG. 3A is shown with the top wall removed and showing an exploded view of the example impedance matching network 359 (see also FIG. 3C). The impedance matching network 359 includes one or more input capacitors 371. The input capacitors 371 serve, at least partially, as an impedance-tuning element and can comprise, for example, lumped elements such as a variable capacitor or an array of capacitors (e.g., a chip capacitor array) coupled in parallel to one another. As shown, by way of example, a first end 361 of the input capacitors 371 is coupled to the RF input coil 331 and second end is coupled to the conductive enclosure 301 through a grounding plate 373. The input capacitors 371 match an output impedance of the RF power supply to the input impedance (for example, 50 ohms) of the lamp 300. In an example embodiment, the input capacitors 371 may be approximately 10 pF to 30 pF to provide a 50 ohm impedance at the RF input port 303. In example embodiments, the input capacitance can be as low as zero and as high as 1000 pF depending upon the design and the frequency of the system. The input impedance can readily be tuned during manufacturing thus ensuring that all lamps are produced with the same, or similar, input impedances regardless of variations in the resonator construction or plasma impedance. The impedance matching network 359 can easily include a tunable capacitor with the capacitance determined by a position of a set screw.

Figure 3E:
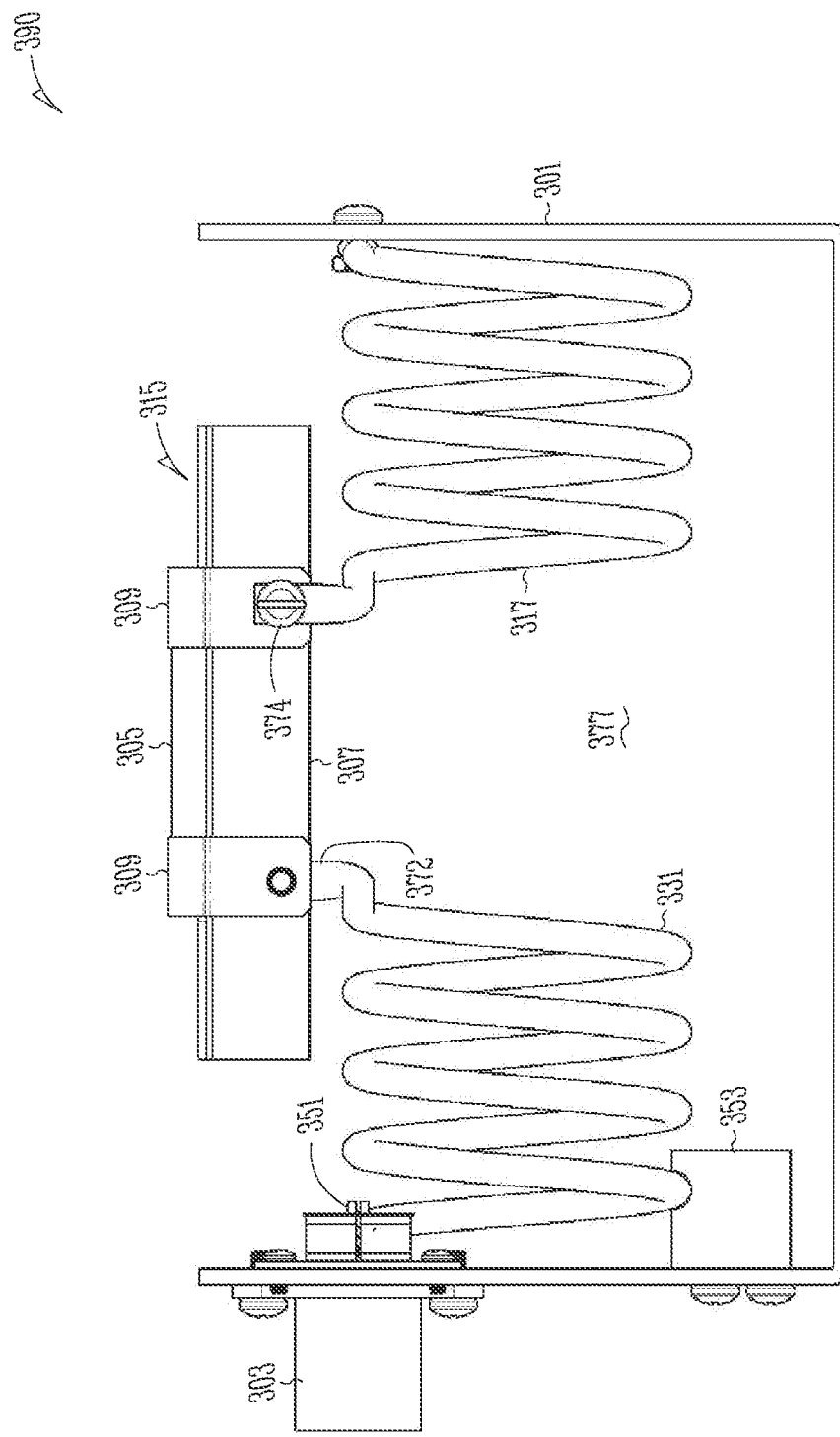
FIG. 3E is a cross-sectional view of the plasma lamp taken at B-B in FIG. 3D.

FIG. 3E is a cross-sectional view of the lamp 300 taken at B-B in FIG. 3D showing, example coupling of the coils 331, 317 to the conductive straps 309. For example, as shown, the ground coil 317 is coupled to one of the conductive straps 309 by one of the screws 374. Other optional coupling arrangements include a push-in connector, a set screw, or other types of connections that allow releasable connection and thereby facilitate replacement of the bulb assembly 315. As can be seen in FIG. 3E, in an example embodiment the bulb assembly 315 is suspended within an air cavity 377 in the conductive enclosure 301.

As mentioned above, the plasma lamp 300 may include components and design aspects of the single-ended balanced resonator design of the plasma lamp 200 (see FIG. 2A). Likewise, the plasma lamp 300 could include components and design aspects of the double-ended balanced resonator design of the plasma lamp 230 (see FIG. 2B).

With reference now to FIGS. 4A through 4C, more example detail is shown of the bulb assembly 315. As discussed, above, with reference to FIG. 3A, in an example embodiment the pair of conductive straps 309 provides coupling points from the input and ground coils 331, 317 (see FIGS. 3B and 3C) to the bulb 305. In an example embodiment, the conductive straps 309 are about 2 mm to 10 mm in width and 250 μm to 500 μm (approximately 10 mils to 20 mils) in thickness. The conductive straps 309 may be formed from various metallic materials, such as stainless steel or titanium, that are capable of withstanding the heat generated by the bulb 305 (e.g., approximately 1000° C. to 1200° C. in certain applications), without deforming. In certain example embodiments, the conductive straps 309 are formed from non-magnetic materials to avoid interference with the magnetic field generated near the bulb assembly 315. In certain example embodiments, materials such as palladium (Pd) or platinum (Pt) may be plated or otherwise formed over the metallic materials to prevent oxidation of the conductive straps 309. The conductive straps 309 also can be positioned along the length of the bulb 305 to control a density distribution of plasma generated within the bulb 305. The density control feature is discussed, by way of example, with reference to FIGS. 5B and 5C, below.

Returning to FIG. 4A, in an example embodiment, the bulb 305 is cylindrical in its center and forms a hemisphere with a tail 381 at each end. The tails 381 may be formed by a quartz tube used to form the bulb 305. In an example embodiment, the tube is sealed at one end that forms a first end of the bulb 305. The bulb 305 is filled through the open end of the tube and sealed. The sealed tube is then placed in a liquid nitrogen bath and a torch is used to collapse the tube at the other end of the bulb 305, which seals the bulb 305 and forms the tail 381. The collapsed tube is then cut for a desired tail length.

FIG. 4B shows a plan view of the bulb assembly 315 while FIG. 4C shows a cross-section of the bulb assembly 315 taken at C-C in FIG. 4B. In some example embodiments, the bulb 305 may be quartz, transparent alumina or other ceramic, sapphire, or other suitable bulb material. The bulb 305 may be cylindrical, pill shaped, spherical, or some other desired shape. The bulb 305 may have an internal length 380 of 30 mm to 60 mm, an outside diameter of about 10 mm and an inside diameter of 6 mm. In other example embodiments, the bulb 305 may have an inside diameter in a range between 2 mm and 30 mm or any range included therein, a wall thickness in a range between 0.5 mm and 4 mm or any range included therein, and an internal length between 10 mm and 80 mm or any range included therein. These dimensions are examples only and other embodiments may use bulbs having different dimensions and/or shapes. In various example embodiments, the bulb 305 contains a fill that forms a light-emitting plasma when the RF power is applied to the bulb 305. The fill may include a metal halide fill, such as indium bromide ($InBr_3$). Additives such as mercury (Hg) may also be used. In other embodiments, different fills such as sulfur (S), selenium (Se) or tellurium (Te) may also be used. In some examples, a metal halide such as cesium bromide (CsBr) may be added to stabilize a discharge of sulfur, selenium, or tellurium.

Figure 4D:
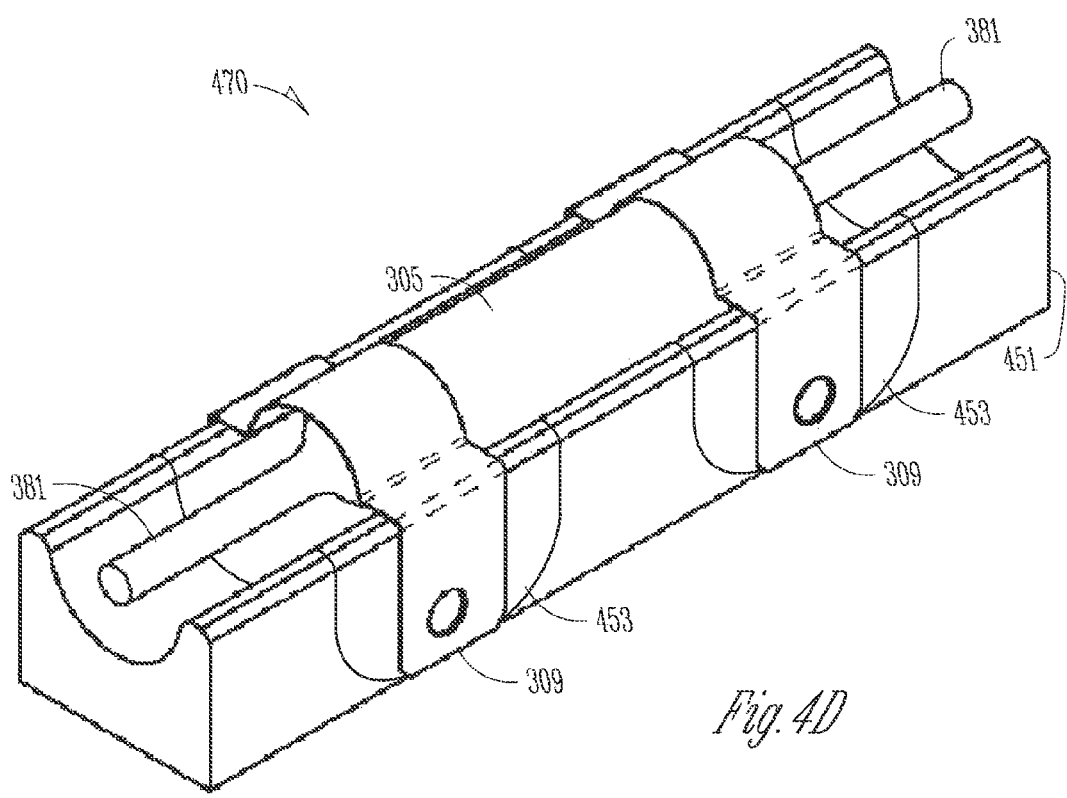
FIG. 4D is an alternative example embodiment of the bulb assembly of FIG. 4A.

FIG. 4D illustrates an alternative example embodiment of the bulb assembly of FIG. 4A. The bulb assembly 470 includes a plated ceramic bulb carrier 451 with conductive areas 453. The conductive areas 453 may be a variety of conductive films plated, deposited, or otherwise applied to the plated ceramic bulb carrier 451. In an example embodiment, the conductive areas 453 comprise silver (Ag) thick film paste applied to opposite locations of the conductive straps 309. The conductive areas 453 can serve to modify the electric field distribution thereby to distribute a density of a generated plasma more uniformly within the bulb 305. The density control feature of the conductive areas 453 is discussed by way of example with reference to FIG. 5B, below. The conductive areas 453 may be of different shapes or dimensions in different example embodiments.

Ideally, in certain embodiments, a temperature of the bulb and the plasma generated therein are isothermal. Under isothermal conditions, light output from the bulb increases for a given input power. The output of a high pressure discharge lamp is strongly related to the temperature of the coldest point on the interior of the bulb surface, the so-called "cold spot," because that is the site where the dose chemicals, such as metal halides and mercury, typically condense. Typically, the higher the cold spot temperature, the more light output is produced. A function of the input power is to heat the cold spot to a sufficiently high temperature through ohmic self-heating of the plasma that large quantities of light are generated. A by-product of this process is that there is a corresponding "hot spot," which is the hottest point on the interior of the bulb surface. The hot spot temperature does not affect the light output, but it does play an role in bulb failure according to two primary mechanisms. The first is bulb melting, where the hot spot temperature exceeds the melting point of the bulb vessel material. In the case of quartz or other glass materials with a continuous viscosity curve and no definite melting point, this temperature is often referred to as the "working point" or "working temperature." For quartz, the working temperature is approximately 1100° C. The second failure mechanism relates to chemical reactions at the hot spot between the dose chemicals and the quartz materials. These reactions can form voids and other microscopic discontinuities in the quartz vessel that can ultimately lead to melting or cracking of the walls. These reactions are known to proceed more quickly at higher temperatures. An optimum design would elevate the cold spot as hot as possible, while reducing the hot spot to be as cold as possible, or in other words, an isothermal bulb. However, as a gas is heated, the density of the gas decreases. Consequently, the less-dense gas rises, leading to asymmetric temperature distributions that generally make isothermal operation difficult or impossible. A condition of the less-dense gas rising is known as a thermal buoyancy force acting on the gas. The thermal buoyancy force can be problematic in applications of plasma lamps where the lamp must be inverted to direct light downward, such as in street lighting. In the inverted position, the greatest density of generated plasma, and hence the greatest amount of generated light, is at the top of the bulb near the reflector and not towards the exposed side of the bulb. Thus, the total output of the lamp is reduced overall for two reasons: First, since the upward-directed light must first reflect from a bulb reflector, with any losses associated with the reflector at a given wavelength. Second, the non-isothermal operation of the lamp requires that the net power supplied to the bulb be somehow limited in order that the hot spot does not exceed the working temperature of quartz. Therefore the cold spot will not be as hot as it could be for the same bulb for the same input power under isothermal conditions. Consequently, a higher light output from the bulb can be achieved as the density of the plasma distribution within the bulb becomes more uniform.

Figure 5A:
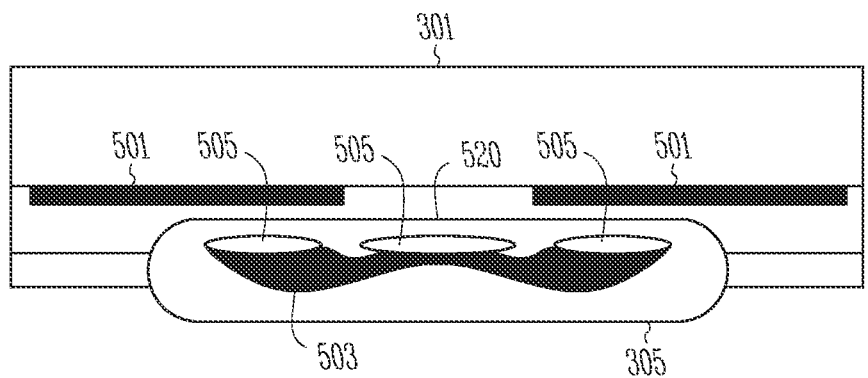
FIG. 5A illustrates an effect of thermal buoyancy forces on plasma density generated within a bulb in proximity to two RF power plates arranged above the bulb.

With reference now to FIG. 5A, an effect of thermal buoyancy forces on plasma density generated within the bulb 305 in proximity to two RF power conductors or plates arranged above the bulb 305 is shown. In FIG. 5A, the bulb 305 is shown facing downward (e.g., when the plasma lamp is deployed in street and area lighting fixtures), with a pair of RF power plates 501 above the bulb 305. The general arrangement of FIG. 5A may be similar to the configuration of the plasma lamps 200, 230 of FIGS. 2A and 2B in which the RF power plates 501 may correspond to the field applicators 211A, 211B. An example application where the bulb 305 faces downward is where the plasma lamp is deployed in street and area lighting installations. A plasma cloud 503 includes plasma arcs 505 generated in locations where the electric field intensity is strongest, which in the example bulb orientation is near a top 520 of the bulb 305. With the example configuration of the RF power plates 501 shown in FIG. 5A, the bulb 305 can melt with only about 350 Watts (W) of RF power applied to the lamp body from the RF power supply due to the effect of thermal buoyancy forcing the plasma to the top 520 of the bulb 305.

Figure 5B:
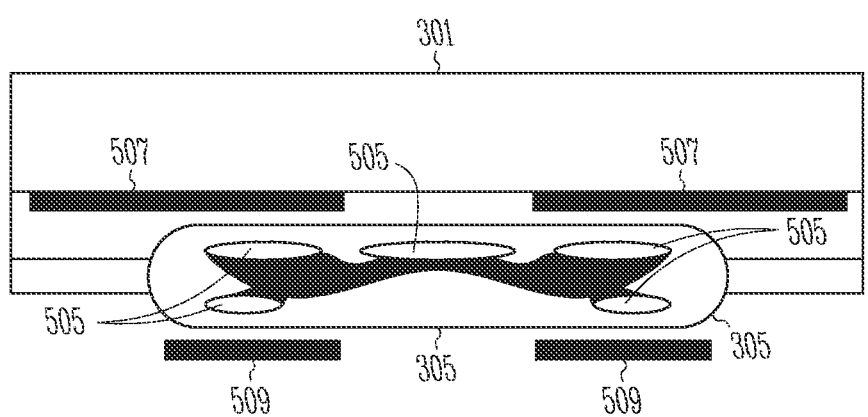
FIG. 5B illustrates an effect of thermal buoyancy forces on plasma density generated within a bulb in proximity to two RF power plates and a pair of conductive bulb straps arranged below the bulb.

FIG. 5B illustrates the effect of thermal buoyancy forces on plasma density generated within the bulb 305 in proximity to a pair of conductors or RF power plates 507 and a pair of conductive bulb straps 509 arranged below the bulb 305. In this example embodiment, the pair of RF power plates 507 is positioned above the bulb 305 and the conductive bulb straps 509 are positioned below the bulb 305. The general arrangement of FIG. 5B may be similar to the configuration of bulb assembly 470 of FIG. 4D in which the pair of RF power plates 507 may correspond to the conductive areas 453, for example, silver paint, on the plated ceramic bulb carrier 451. This configuration may spread the plasma density more evenly in the bulb 305, thus making the thermal load more uniform within the bulb 305; the thermal loading is redistributed to the bottom of the bulb 305. Consequently, in an example embodiment, the bulb 305 can be driven to about 500 W of power or more since the lowermost plasma arcs "attach" to the conductive bulb straps 509.

Figure 5C:
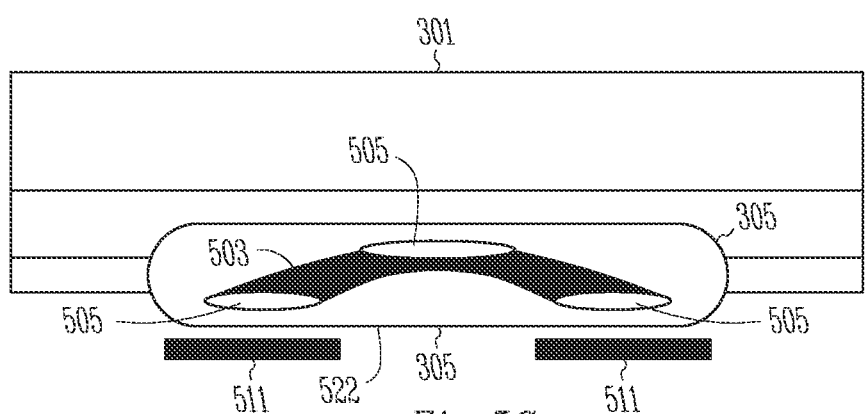
FIG. 5C illustrates the effect of thermal buoyancy forces on plasma density generated within a bulb in proximity to two bulb straps arranged below the bulb.

FIG. 5C illustrates the effect of thermal buoyancy forces on plasma density generated within the bulb 305 in proximity to the conductive bulb straps 509 arranged below the bulb 305. In FIG. 5C the RF power plates 501 of FIG. 5A and the pair of RF power plates 507 of FIG. 5B have been removed. The plasma attachment is primarily along the bottom 522 of the bulb 305 proximate to a pair of lower RF conductors or plates 511. Similar to FIG. 5B, in an example embodiment, the configuration of FIG. 5C also allows bulbs to be run to 500 W or more without melting. Consequently, more RF power can be applied to the bulb 305, producing a greater light output. Thus power fed into the lamp body by a power source may be increased.

Although the various plasma lamp designs have been described in light of particular example embodiments, various other designs and material choices are used in different example embodiments. These alternative designs and material choices may include various material and formation choices. For example, the field applicators and other RF carrying conductive areas might be formed from bulk or sheet metal materials, or be fabricated from one or more thick-film metals fired onto a ceramic substrate. In either construction, the applicator metal might be coated with an insulating dielectric to prevent arcing from the high voltage present on the applicator plates. For the thick-film on ceramic applicators, one choice is glass frit.

Additionally, although specific frequency ranges have been presented, in other example embodiments the lamp designs presented herein can be scaled appropriately for other frequencies. For example, in addition to the 40.68 MHz frequency discussed, by way of example herein, internationally-recognized ISM frequency bands are also designated for lighting at 13.56 MHz and 27.12 MHz. At these frequencies, even compact high-Q coils become fairly large to realize the required phase shift. However, an additional phase shift can be achieved without increasing coil size by loading the coil with, for example, a ferrite material having a higher relative magnetic permeability than air (e.g., $\Box_r$ greater than 1). Typical permeability values might be selected for $\Box_r$ as approximately 40 for a 40.68 MHz design, and $\in_r$ as approximately 100 for a 13.56 MHz design. The ferrite loading of the coils can also be used to tune the resonant frequency. If the ferrite position is adjustable, then the cavity resonant frequency can be also adjusted in the manufacturing process.

Additionally, at low frequencies, the capacitance between the field applicator plates and the plasma arc can be an important parameter. The capacitance, $Z_c$, appears in series with the plasma resistance, $R_{plasma}$. Also, the capacitance appears twice in series, once at each field applicator. Consequently, the total bulb impedance is $Z_{bulb}=R_{plasma}+2Z_c$. The impedance of a capacitor is given by $Z_c=1/j\omega C$, so as frequency decreases, the capacitor impedance may dominate the total impedance; thus, $R_{plasma}$ may receive increasingly less of the applied voltage. To mitigate this effect, the capacitance, C, must increase as frequency decreases. For example, at 80 MHz the required capacitance is about 5 pF to maintain an approximately 95% resonator efficiency with a plasma at 200Ω to 500Ω resistance and coils with a Q factor greater than 200. At 40 MHz, the required capacitance is about 10 pF. To achieve higher capacitance, the overlapping surface area between the applicator plates and the plasma can be increased by using a larger bulb. Also, the thickness of the bulb wall may be reduced or the bulb dielectric constant of the bulb may be increased by using a ceramic bulb.

Figure 6A:
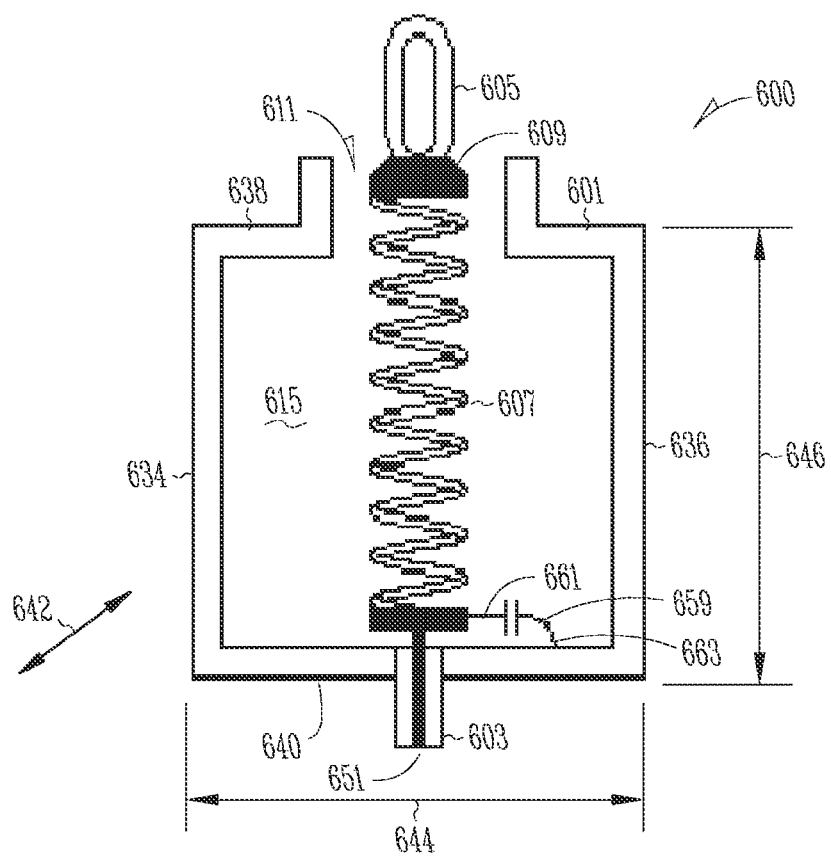
FIG. 6A illustrates a single-inductor-coil electrodeless plasma lamp and a non-coiled electrodeless plasma tamp, each having a schematic depiction of a capacitor.
Figure 6A:
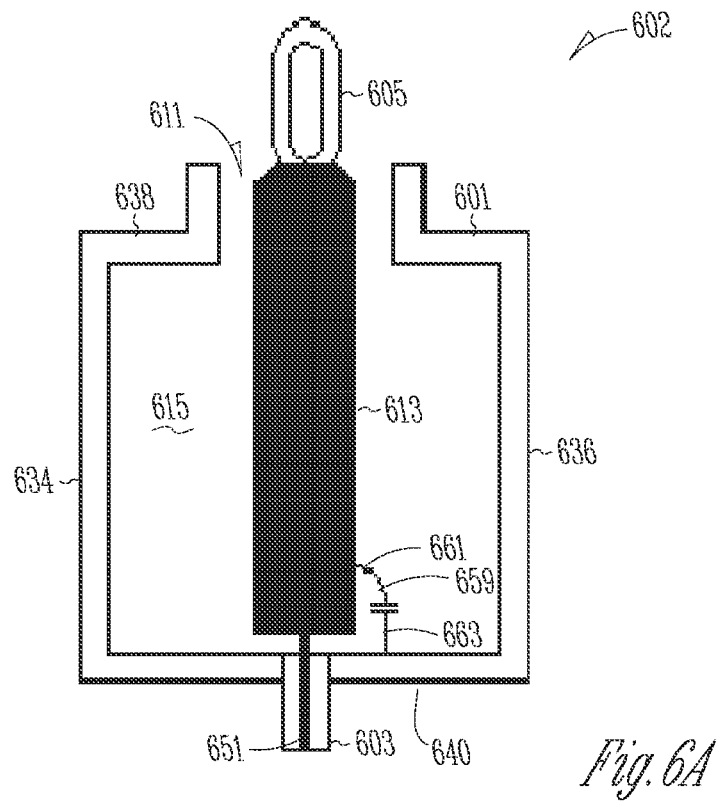

Referring now to FIG. 6A, an example single-inductor-coil electrodeless plasma lamp 600 is shown to include a conductive enclosure 601 having an RF input port 603. The RF input port 603 is to couple power from an RF power supply to the single-inductor-coil electrodeless plasma lamp 600. An outer edge of the RF input port 603 is electrically coupled to the conductive enclosure 601. An inner conductor 651 of the RF input port 603 is electrically coupled to a first end of a single-inductor-coil 607. The single-inductor-coil electrodeless plasma lamp 600 is further shown to include a bulb 605, a metal post structure 609 surrounding an end of the bulb 605, and one or more input capacitors 659. The metal post structure 609 is electrically coupled to a second end of the single-inductor-coil 607. The conductive enclosure 601 surrounds a dielectric volume 615. In an example embodiment, the dielectric volume 615 may be air. The metal post structure 609 serves to couple RF power to the bulb 605 and, additionally, holds or supports the bulb 605 mechanically in position. The metal used in the metal post structure 609 can be, but is not limited to, aluminum, brass, copper, gold, or silver. The single-inductor-coil 607 may be fabricated from either a solid material or a tubular material. In various example embodiments, the single-inductor-coil 607 may comprise a single electrically-conductive material. In other example embodiments, the single-inductor-coil 607 may be comprised of a dielectric material coated, plated, or otherwise formed with a conductive material or layer. In the case of the single-inductor-coil 607 being fabricated from a dielectric tubular material, either the inside surface of the tubular material, the outside surface, or both surfaces may be covered with a conductive material. In other example embodiments, the single-inductor-coil 607 may be bent or otherwise formed from metal tubing. For example, in an example embodiment, copper tubing with an outside diameter of 6 mm and an inside diameter of 4 mm can be sued. Because of the typical RF frequencies employed in an electrodeless lamp design, the inside diameter is somewhat irrelevant as long as the wall thickness is greater than approximately 0.2 mm. In example embodiments, outside diameters of tubes might be in the range of about 2 mm to about 20 mm. More details on formation and selection of the single-inductor-coil 607 are discussed, by way of example, below.

The example input capacitors 659 serve, at least partially, as an impedance-tuning or matching element and can comprise, for example, lumped elements such as a variable capacitor or an array of capacitors (e.g., a chip capacitor array) combined in any series and parallel combination or arrangement. As shown, by way of example, a first end 661 of the input capacitor 659 is coupled to the single-inductor-coil 607 and a second end 663 is coupled to the conductive enclosure 601. The input capacitors 659 can be selected to match an input impedance of the lamp 600 to the output impedance (for example, 50 ohms of the RF power supply. In a specific example embodiment, the input capacitors 659 may be about 1 pF to about 30 pF to provide a 50 ohm impedance at the RF input port 603. In example embodiments, the input capacitance can be as low as zero and as high as 1000 pF depending upon the design and the frequency of the system. More details on formation and selection of the input capacitors 659 are discussed, by way of example, below. The input impedance can readily be tuned during manufacturing thus ensuring that all lamps are produced with the same, or similar, input impedances regardless of variations in the resonator construction or plasma impedance. For example, during manufacturing final test operations, the input capacitors 659 can be adjustable capacitors that can easily be tuned by adjusting a set screw. An embodiment with a tunable capacitor is discussed in more detail, by way of example, below.

The conductive enclosure 601 may be similar to the conductive enclosure 301 (see for example FIG. 3A) and the single-inductor-coil 607 may be similar to RF input coil 331 (see FIG. 3B). The bulb 605 may be similar to other bulbs discussed herein such as the bulb 101 or the bulb 131. The conductive enclosure 601 has spaced parallel sidewalls 634, 636, a top wall 638, and a bottom wall 640. In some example embodiments, the conductive enclosure 601 may be cubical, a rectangular prism, parallelepiped, or cylindrical in shape. In some example embodiments, the conductive enclosure 601 has a side wall height 646 of about 20 mm to about 70 mm, a width about 644 of 20 to about 70 mm, and a depth 642 (not shown) of about 20 mm to about 70 mm, or any range subsumed therein. In other example embodiments, the side wall height 646, the width 644, and the depth 642 is between about 40 and about 50 mm, or any range included therein.

When RF power is supplied to the lamp 600, the RF power is conducted through the single-inductor-coil 607 to the metal post structure 609. In an annular space 611 surrounding the metal post structure 609 and the bulb 605, one-field is generated from the single-inductor-coil 607 and the metal post structure 609 to the top wall 638 of the conductive enclosure 601. At least a portion of the generated e-field flows through the bulb 605, igniting the plasma contained within the bulb 605 and producing light.

With continued reference to FIG. 6A, a non-coiled electrodeless plasma lamp 602 is shown to include a non-coiled RF input rod 613. The non-coiled RF input rod 613 may be fabricated from either a solid material or a tubular material. In various example embodiments, the non-coiled RF input rod 613 may be comprised of an electrically-conductive material. In other example embodiments, the non-coiled RF input rod 613 may comprise a dielectric material coated, plated, or otherwise formed with a conductive material. In the case of the non-coiled RF input rod 613 being fabricated from a dielectric tubular material, either the inside surface of the tubular material, the outside surface, or both surfaces may be covered with a conductive material. The non-coiled electrodeless plasma lamp 602 functions in a similar fashion as the single-inductor-coil electrodeless plasma lamp 600.

FIGS. 6B through 6G all function in a similar fashion to the plasma lamps described above, by way of example, with reference to FIG. 6A. However, for either the coiled or non-coiled versions of the plasma lamps, a number of example embodiments are shown to realize the one or more input capacitors 659.

Figure 6B:
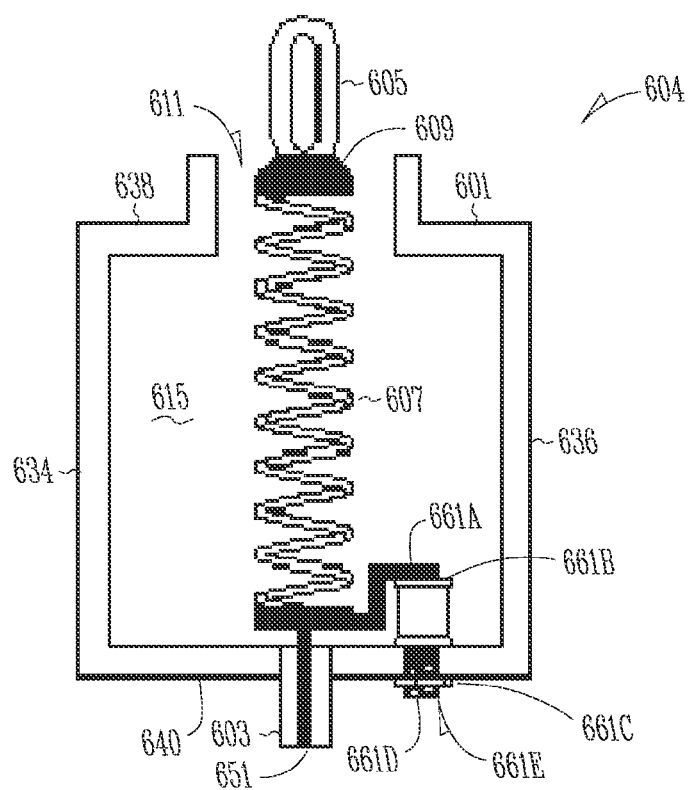
FIG. 6B illustrates a single-inductor-coil electrodeless plasma lamp and a non-coiled electrodeless plasma lamp, each having a tunable high power capacitor, grounded to the bottom wall of a conductive enclosure.
Figure 6B:
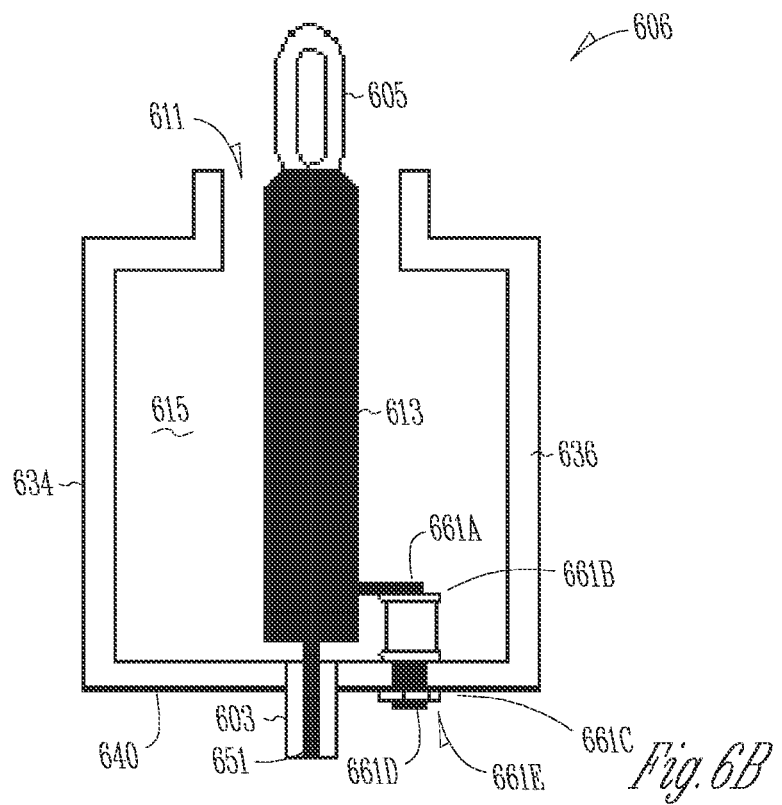

For example, the embodiments of FIG. 6B illustrates a single-coil electrodeless plasma lamp 604 and a non-coiled electrodeless plasma lamp 606, each having a tunable high power capacitor 661B, the tunable high power capacitor 661B being grounded on a first end to the bottom wall 640 of the conductive enclosure 601. The tunable high power capacitor 661B is electrically coupled on a second end to the single-inductor-coil 607 through a conductor element 661A and on the first end to the conductive enclosure 601 by a panel-mount screw 661D and secured with a nut 661C. The panel-mount screw 661D, and the nut 661C, provide both electrical and mechanical connections between the tunable high power capacitor 661B and the conductive enclosure 601. The tunable high power capacitor 661B also includes a screw adjustment mechanism 661E to variably adjust a capacitance value of the tunable high power capacitor 661B.

Figure 6C:
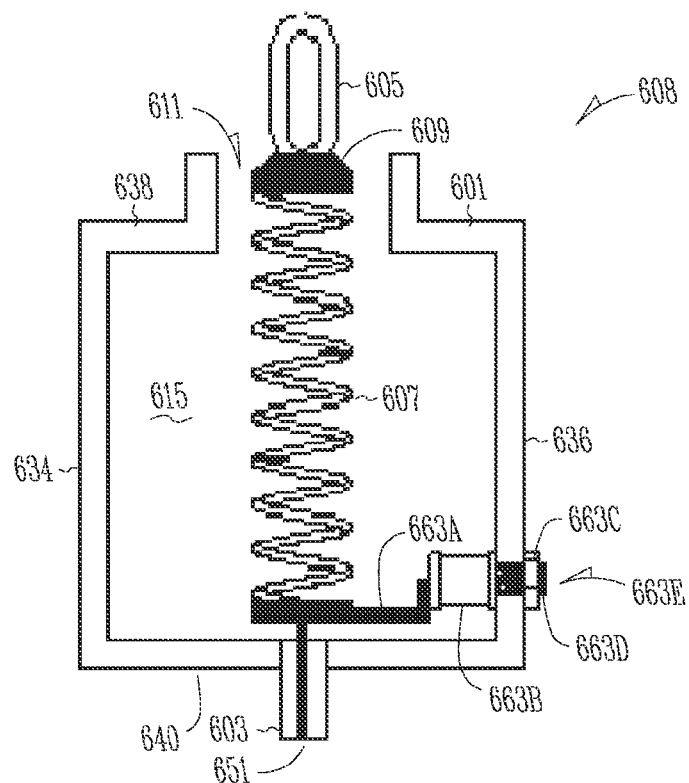
FIG. 6C illustrates a single-inductor-coil electrodeless plasma lamp and a non-coiled electrodeless plasma lamp, each having a tunable high power capacitor, grounded to a side wall of a conductive enclosure.
Figure 6C:
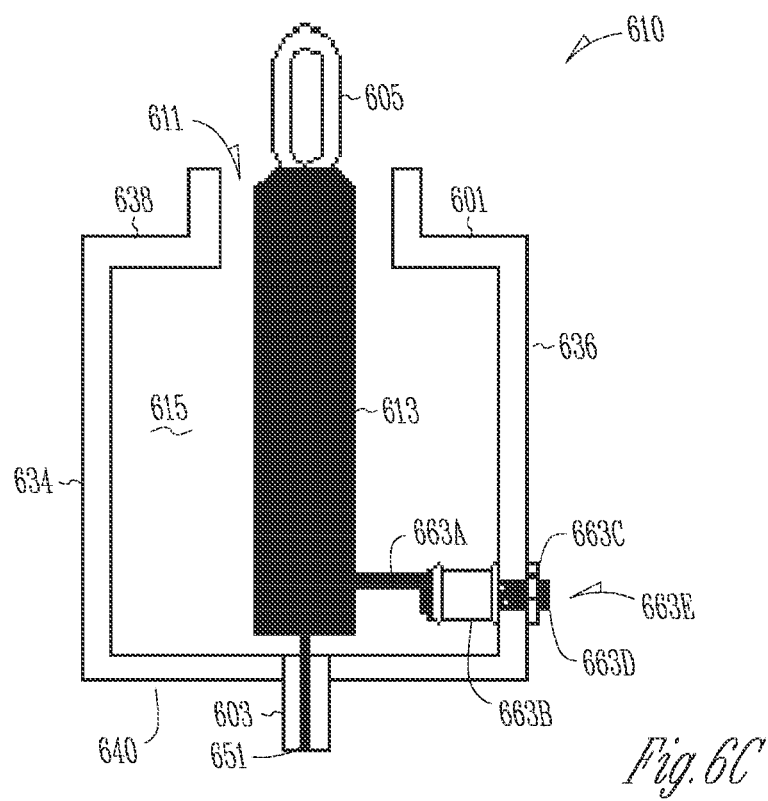

The embodiment of FIG. 6C illustrates a single-coil electrodeless plasma lamp 608 and a non-coiled electrodeless plasma lamp 610, each having a tunable high power capacitor 663B, grounded to at least one of the parallel sidewalk 634, 636 of the conductive enclosure 601. The tunable high power capacitor 663B is electrically coupled on a first end to the single-inductor-coil 607 through a conductor element 663A and on a second end to the conductive enclosure 601 by a panel mount machine screw 663D and secured with a nut 663C. The panel mount machine screw 663D and secured with the nut 663C provide both electrical and mechanical connections between the tunable high power capacitor 663B and the conductive enclosure 601. The tunable high power capacitor 663B also includes a screw adjustment mechanism 663E to variably adjust a capacitance value of the tunable high power capacitor 663B. This embodiment is similar to the embodiments of FIG. 6B except the capacitor is grounded to the sidewall rather the bottom wall. Since the ground voltage is continuously variable along the side of the conductive enclosure 601, there will be a slightly different input impedance when the tunable high power capacitor 663B is grounded at different locations. Thus, for certain manufacturing or mounting applications of the lamp, there may be a preference for the point at which the tunable high power capacitor 663B is mounted.

Figure 6D:
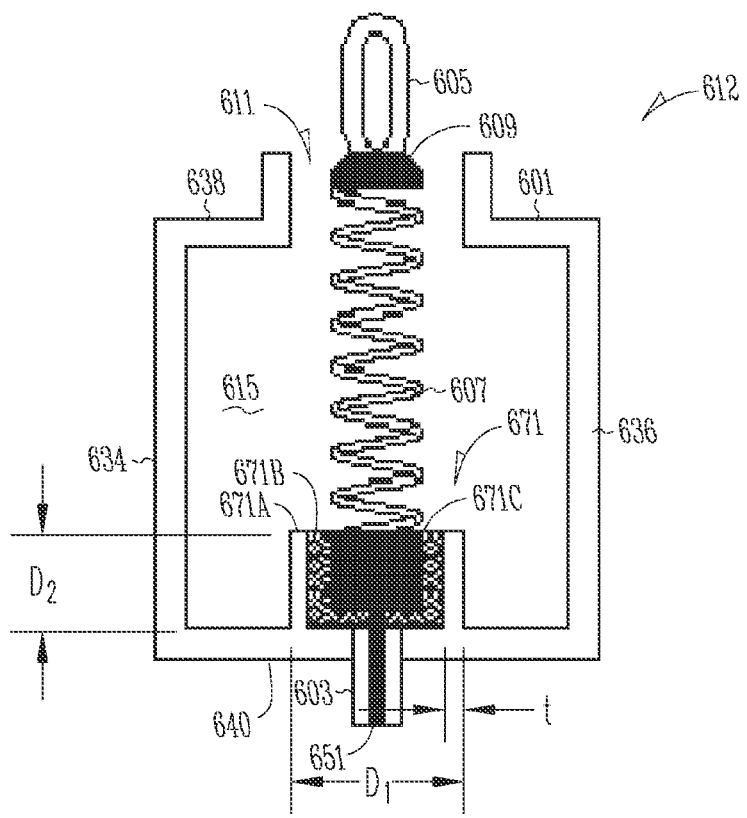
FIG. 6D illustrates a single-inductor-coil electrodeless plasma lamp and a non-coiled electrodeless plasma lamp, each having an annular ring surrounding an input side of a center conductor with an optional insulating dielectric.
Figure 6D:
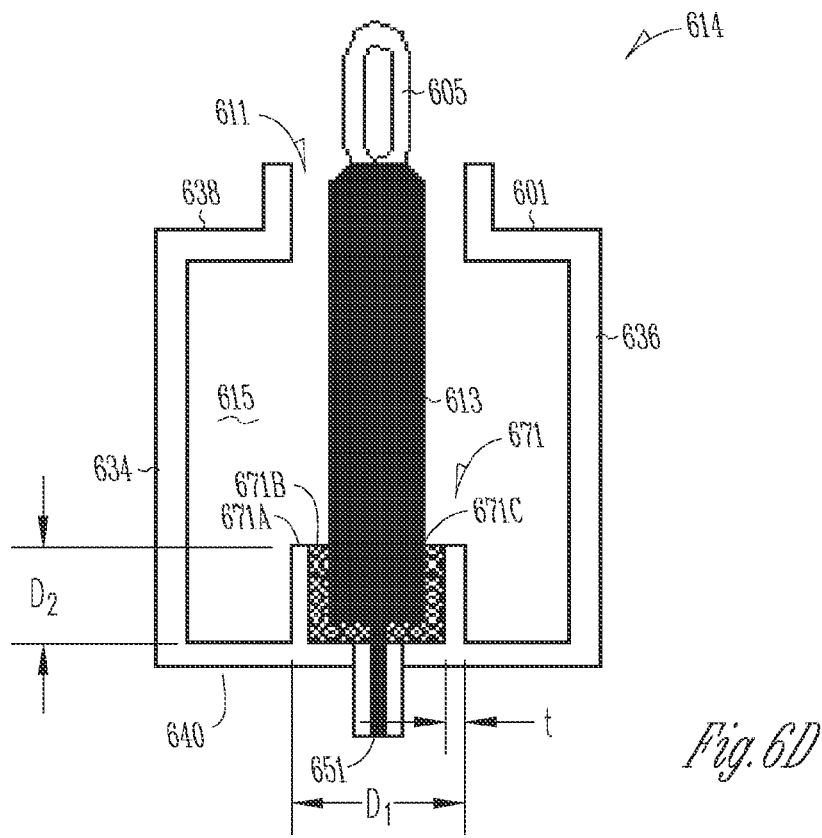

FIG. 6D illustrates a single-coil electrodeless plasma lamp 612 and a non-coiled electrodeless plasma lamp 614, each having a capacitive element 671 formed from a first annular ring 671A and a second annular ring 671C surrounding the input side of the inner conductor 651. The first annular ring 671A and the second annular ring 671C are separated by an optional dielectric material 671B. However, the optional dielectric material 671B may be the same material as comprises the dielectric volume 615 (e.g., air). In some embodiments, rather than being an annular ring, the second annular ring 671C can be a solid conductive material electrically coupled to the inner conductor 651. The capacitive element 671 is formed within the volume of the conductive enclosure 601. Although a determining factor for the capacitive element 671 is the thickness of the dielectric material 671B, a first dimension, $D_1$, of the first annular ring 671A may be from 0.1 mm to 5 mm, or any value subsumed therein. In some embodiments, the thickness, t, of the first annular ring 671A may be the same as the thickness of the conductive enclosure 601. In some embodiments, the thickness, t, of the first annular ring 671A may be from 0.1 mm to 10 mm, or any value subsumed therein. A second dimension, $D_2$, of the second annular ring 671C may be from 1 mm to 40 mm, or any value subsumed therein. Although not shown explicitly, a skilled artisan can envision a plurality of additional concentric annular rings (or other arrangements of metal interleaved with dielectric materials), alternately coupled to the conductive enclosure 601 or the inner conductor 651, with each subsequent annular ring being separated from the prior annular ring by a dielectric material. The additional plurality of concentric annular rings has an increased area and, thus, an increased capacitance over the annular rings shown.

In the non-coiled electrodeless plasma lamp 614 of FIG. 6D, the second annular ring 671C may be either all or a portion of the non-coiled RF input rod 613. Alternatively, the second annular ring 671C may be interspersed between the inner conductor 651 and the non-coiled RF input rod 613.

Figure 6E:
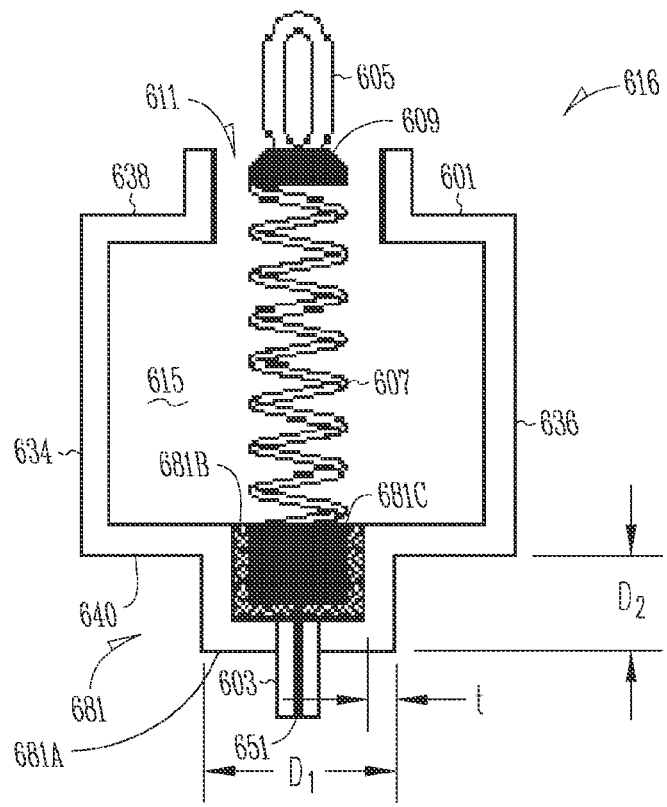
FIG. 6E illustrates a single-inductor-coil electrodeless plasma lamp and a non-coiled electrodeless plasma lamp, each having an annular ring surrounding the input side of the center conductor with an optional insulating dielectric, the annular ring being formed within the lamp chamber.
Figure 6E:
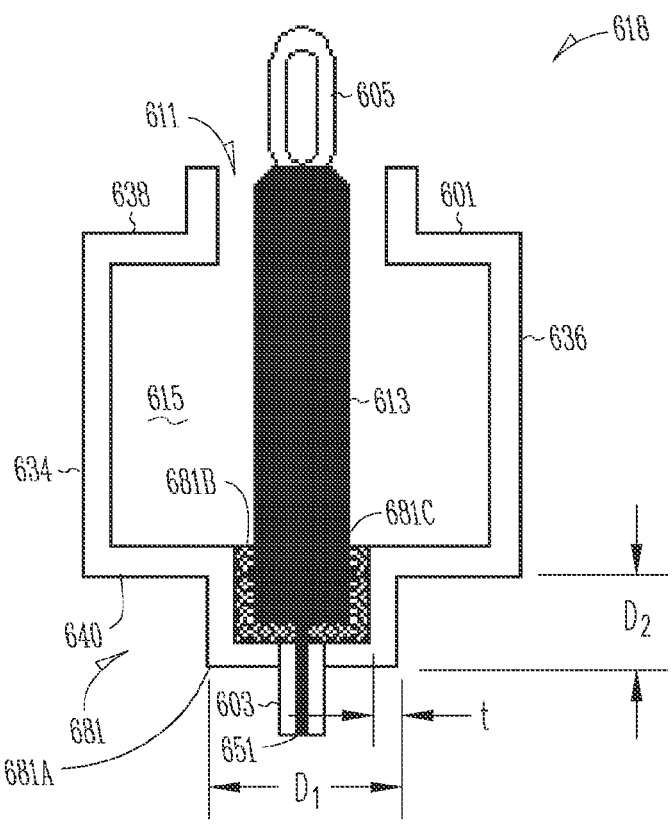

FIG. 6E illustrates a single-coil electrodeless plasma lamp 616 and a non-coiled electrodeless plasma lamp 618, each having a capacitive element 681 formed from a first annular ring 681A and a second annular ring 681C surrounding the input side of the inner conductor 651. The first annular ring 681A and the second annular ring 681C are separated by an optional dielectric material 681B. However, the optional dielectric material 681B may be the same material as comprises the dielectric volume 615 (e.g., air). In some embodiments, rather than being an annular ring, the second annular ring 671C can be a solid conductive material electrically coupled to the inner conductor 651. Unlike the embodiments shown in FIG. 6D in which the capacitive element 671 is formed within the volume of the conductive enclosure 601, the embodiments of FIG. 6E have the capacitive element 681 formed outside the conductive enclosure 601. The conductive enclosure 601 of FIG. 6E may be the same height as the embodiments of FIG. 6D. Alternatively, the height of the conductive enclosure 601 in the embodiments shown in FIG. 6E may be reduced by all or a portion of the height, $D_2$, of the capacitive element 681. As with the embodiments of FIG. 6D, and although not shown explicitly, a skilled artisan can envision a plurality of additional concentric annular rings, alternately coupled to the conductive enclosure 601 or the inner conductor 651, with each subsequent annular ring being separated from the prior annular ring by a dielectric material. The additional plurality of concentric annular rings has an increased area and, thus, an increased capacitance over the annular rings shown.

In the non-coiled electrodeless plasma lamp 618 of FIG. 6E, the second annular ring 681C may be either all or a portion of the non-coiled RF input rod 613. Alternatively, the second annular ring 681C may be interspersed between the inner conductor 651 and the non-coiled RF input rod 613.

Figure 6F:
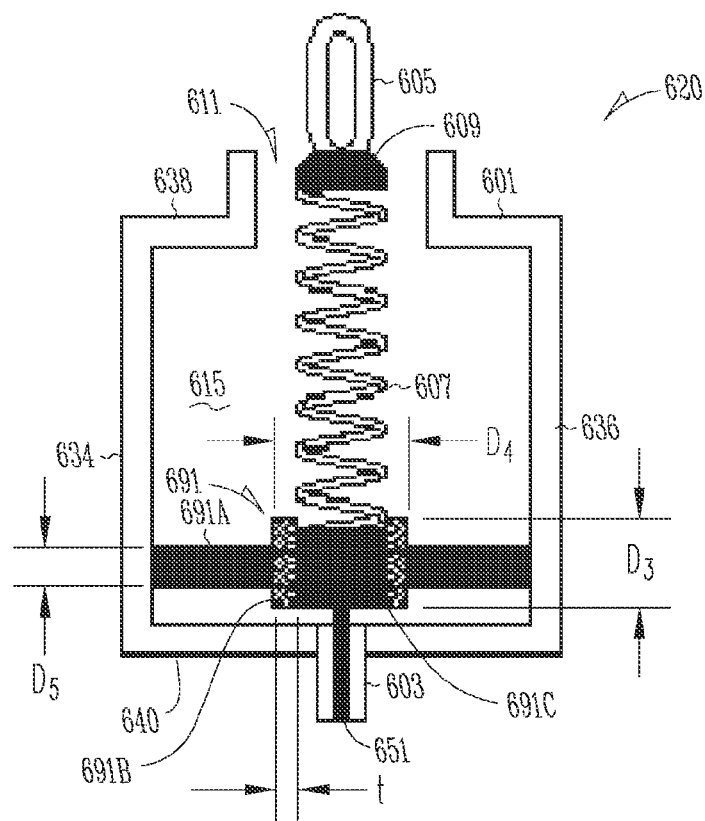
FIG. 6F illustrates a single-inductor-coil electrodeless plasma lamp and a non-coiled electrodeless plasma lamp, each having a collar extending from the cavity wall to the center conductor, with an optional insulating dielectric.
Figure 6F:
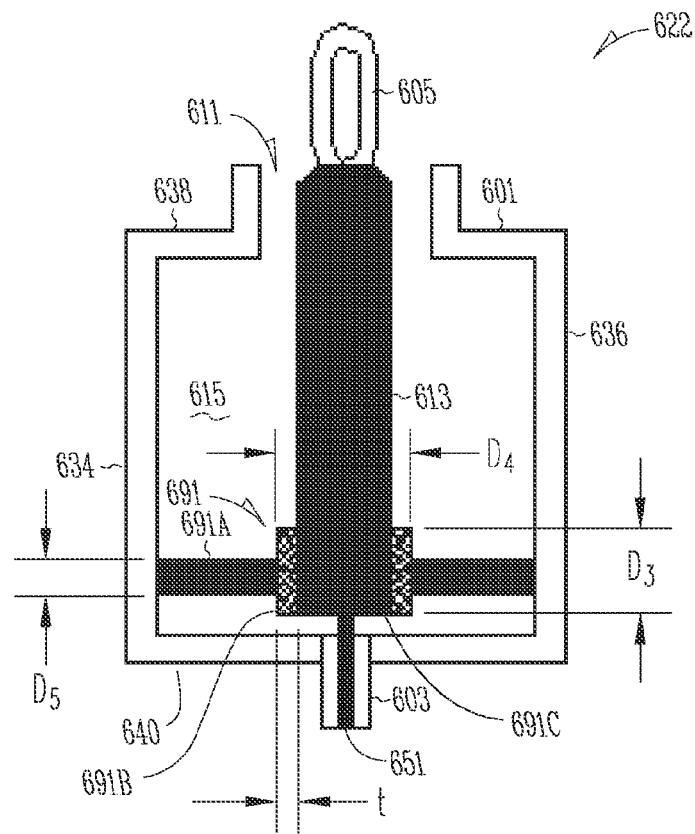

FIG. 6F illustrates a single-coil electrodeless plasma lamp 620 and a non-coiled electrodeless plasma lamp 622, each having a capacitive element 691 formed from a first annular ring 691A, (e.g., a collar or conductive annulus), and a second annular ring 691C surrounding the input side of the inner conductor 651. The first annular ring 691A and the second annular ring 691C are separated by an optional dielectric material 691B. However, the optional dielectric material 691B may be the same material as comprises the dielectric volume 615 (e.g., air). The first annular ring 691A extends from the parallel sidewalls 634, 636 to the optional dielectric material 691B. In some embodiments, the first annular ring 691A may be a plurality of conductive rods extending from the parallel sidewalk 634, 636 to the optional dielectric material 691B. A dimension, $D_5$, of the first annular ring 691A is not critical as long as it is sufficient to carry current required for the capacitive element 691. In some embodiments, rather than being an annular ring, the second annular ring 691C can be a solid conductive material electrically coupled to the inner conductor 651. A dimension, $D_3$, of the second annular ring 691C may be from 1 mm to 40 mm, or any value subsumed therein. In some embodiments, the thickness, t, of the second annular ring 691C may be the same as the thickness of the conductive enclosure 601. In some embodiments, the thickness, t, of the second annular ring 691C may be from 0.1 mm to 10 mm, or any value subsumed therein.

In the non-coiled electrodeless plasma lamp 622 of FIG. 6F, the second annular ring 691C may be either all or a portion of the non-coiled RF input rod 613. Alternatively, the second annular ring 691C may be interspersed between the inner conductor 651 and the non-coiled RF input rod 613.

Figure 6G:
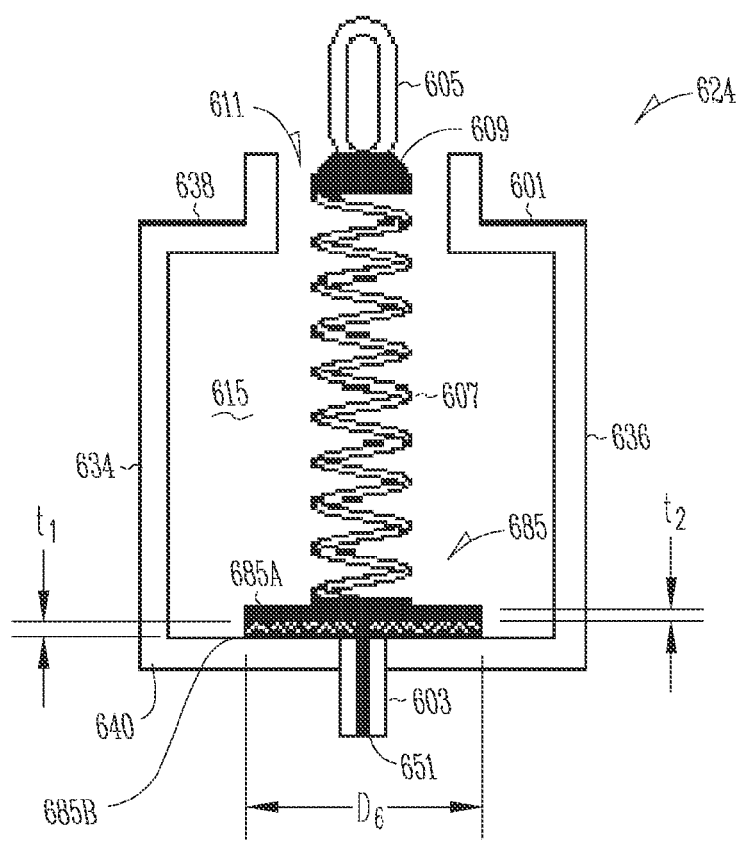
FIG. 6G illustrates a single-inductor-coil electrodeless plasma lamp and a non-coiled electrodeless plasma lamp, each having a flange feature extending outward from the center conductor to create a larger overlap area with the cavity bottom wall.
Figure 6G:
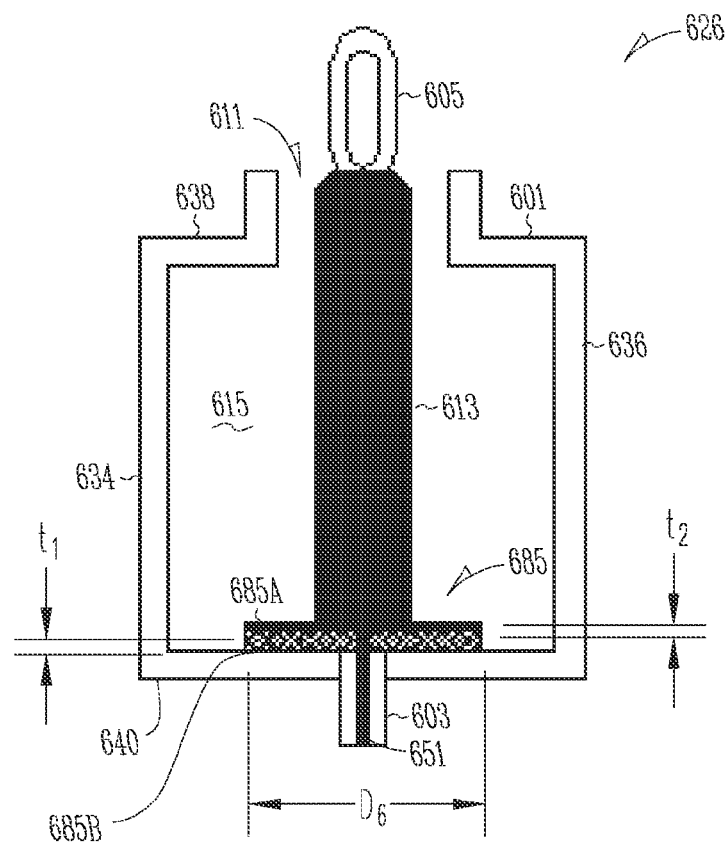

FIG. 6G illustrates a single-coil electrodeless plasma lamp 624 and a non-coiled electrodeless plasma lamp 626, each having a flange feature that forms a capacitive element 685 extending outward from the center conductor to create a larger overlap area with the bottom wall 640 of the conductive enclosure 601. The bottom wall 640 of the conductive enclosure 601 forms a first conductor in the capacitive element 685 while a second conductor 685A forms a second conductor of the conductive element. The second conductor 685A is electrically coupled to the inner conductor 651 and is separated from the bottom wall 640 by a dielectric material 685B. Depending upon a required capacitance value desired for a given input impedance, a dimension, $D_6$, of the second conductor 685A and the dielectric material 685B may be from a few millimeters up to an internal dimension of the conductive enclosure 601, or any value subsumed therein. In some embodiments, the thicknesses, $t_1$ and $t_2$, may also be selected based on a desired input impedance. Equations for determining capacitance values for a given set of dimensions and dielectric constants are known in the art.

In the non-coiled electrodeless plasma lamp 626 of FIG. 6G, the second conductor 685A may be either all or a portion of the non-coiled RF input rod 613. Alternatively, the second conductor 685A may be interspersed between the inner conductor 651 and the non-coiled RF input rod 613.

Figure 6H:
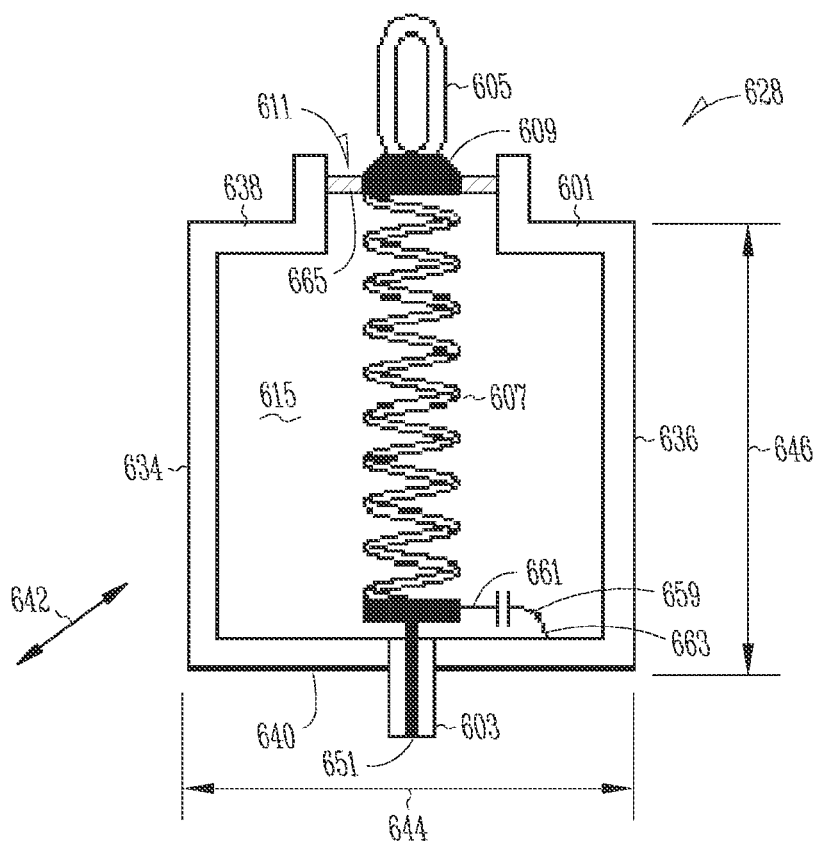
FIG. 6H illustrates a single-inductor-coil electrodeless plasma lamp and a non-coiled electrodeless plasma lamp, each having a dielectric positioning material surrounding either a metal post structure or a non-coiled input rod proximate to the bulb.
Figure 6H:
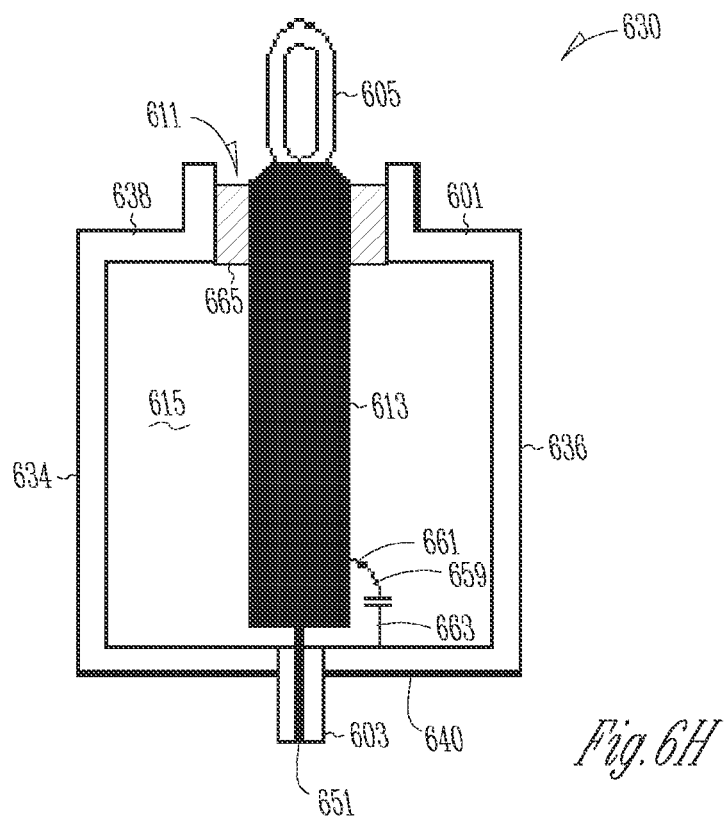

FIG. 6H illustrates a single-coil electrodeless plasma lamp 628 and a non-coiled electrodeless plasma lamp 630, each having a dielectric positioning material 665 surrounding either the metal post structure 609 or the non-coiled input rod proximate to the bulb 605. Exact dimensions of the dielectric positioning material 665 are not critical as the dielectric positioning material 665 is used to mechanically secure the bulb 605 in a fixed position. Further, the dielectric positioning material 665 can be formed from, for example, quartz or alumina, to further tower the resonant frequency of the lamp. The dielectric positioning material 665 can be used in conjunction with any of the previous embodiments depicted in FIGS. 6A through 6G.

Within any of the embodiments depicted in FIGS. 6A through 6H, the single-inductor-coil 607 can have anywhere from less than 2 to 50 windings. In some embodiments, the windings can be more than one winding, including portions, and may be greater than 50 windings. In still other embodiments, the windings can be a portion of one winding.

One advantage of the inventive subject matter of the various embodiments is that the single-inductor-coil 607 and the non-coiled RF input rod 613 serve as an effective means of dissipating heat from the bulb 605 within the conductive enclosure 601 thus creating improved device heat transfer characteristics. That is, the single-inductor-coil 607 and the non-coiled RF input rod 613 each draw a substantial portion of the thermal energy generated from the bulb 605 away through the material or coatings of the single-inductor-coil 607 and the non-coiled RF input rod 613, while maintaining the coil or rod at a desirable temperature. Such desirable temperature leads to desirable conductive characteristics of the single-inductor-coil 607 and the non-coiled RF input rod 613 to maintain the performance (e.g., efficiency) of the plasma lamp according to a specific embodiment. During the creation of a plasma, a great amount of heat is generated. As the single-inductor-coil 607 and the non-coiled RF input rod 613 are coupled directly to the metal post structure 609 which holds the bulb 605, the generated heat is conducted into, for example, the bottom wall 640 and the RF input port 603. Additionally, the use of a single-inductor-coil 607 creates a thermal structure with a larger surface area in which the generated heat can dissipate into the air through convective cooling. By creating a larger surface area in which the surrounding air comes into contact with, a greater amount of heat is dissipated from the bulb 605. The improved heat transfer characteristics of the lamp lead to improved reliability and safety.

As used herein, the term "coil" or "inductor" may include regularly spaced windings or irregularly spaced windings, as well as spiral, rectangular, helical, annular, polygon, or any combination of these, and others that would be understood by one of ordinary skill in the art.

Exact values for the various inductive and capacitive components can depend on a number of factors including the desired frequency used to drive the RF power, exact geometries of the lamp, and geometries of the conductive enclosure proximate to the bulb. For example, Table 1 shows particular values for capacitance, C, (either in series or parallel) and inductance, L, for a given input frequency for various specific example embodiments.

TABLE 1

| Frequency (MHz) | Typical L (nH) | Typical C (pF) |
| --- | --- | --- |
| 900 | 9.8 | 13 |
| 450 | 35.3 | 14.8 |
| 80 | 380 | 68 |
| 40 | 1268 | 46 |
| 13 | 3358 | 315 |

However, Table 1 is provided merely as a general guideline and can vary significantly for particular lamp designs. For example, at a 900 MHz driving frequency, a value of L may be in the range 1 nH to 20 nH with a value of C in the range 0 pF to 20 pF. At 450 MHz, a value of L may be from 10 nH to 100 nH with a value of C from 0 pF to 40 pF. At 80 MHz, L might be from 100 nH to 1000 nH (i.e., 0.1 µH to 1 µH), and C might be from 0 pF to 100 pF. For particular applications of an electrodeless lamp, 80 MHz is a useful drive frequency because it is a low enough frequency that an associated power amplifier is reasonably inexpensive and efficient, but the lamp enclosure is also not so big because L is not too big (e.g., less than 1000 nH). At 40 MHz, L might take on a value between 0.5 µH to 2 µH with and C being in a range from 0 pF to 200 pF. 40 MHz is another useful frequency for certain applications because there is an unlicensed ISM band at 40.68 MHz. At 13 MHz, L might be in a range from 1 µH to 20 µH, and C might be in a range from 0 pF to 500 pF 13.56 MHz is a useful frequency in the ISM bands—notably because harmonics of 13.56 MHz (i.e., 27.12 MHz and 40.68 MHz), are also ISM bands. Therefore, shielding requirements for a lamp may be reduced.

Coil turns and dimensions are subject to the required inductance. As discussed above, a particular equation, valid for round coils in air cavities, determines inductance (in microhenries), as a function of the number of turns, n, the radius of each turn, and the overall coil length.

Thus, in an example embodiment, an electrodeless plasma lamp comprises a conductive enclosure including a dielectric material, a bulb containing a fill to form a light emitting plasma, a radio frequency (RF) feed connectable to an RF power source and configured to couple RF power into the conductive enclosure, at least one conductive applicator to apply power from the conductive enclosure to the bulb, and at least one lumped inductive element coupled between the RF feed and conductive applicator. The dielectric material may be air.

The conductive enclosure may define a hollow cavity and the at least one lumped inductive element may be positioned at least partially within the conductive enclosure. The at least one lumped inductive element may be coupled to the RF feed and extend within the conductive enclosure terminating proximate an end of the bulb.

In an example embodiment, the at least one lumped inductive element is a helically wound coil. The radius of the coil may be between about 2 millimeters and about 60 millimeters. A length of the coil may be between about 10 millimeters and about 200 millimeters. In an example embodiment, the coil is wound from a hollow material. The helically wound coil in some embodiments is provided with a ferrite material having a higher relative magnetic permeability than air. The lumped inductive element may have an inductance of between about 5 nanohenries and 5000 nanohenries dependent upon the operating frequency of the plasma lamp. The at least one conductive applicator may be a first conductive applicator, the plasma lamp further comprising a second conductive applicator, the first and second conductive applicators being located proximate opposed ends of the bulb. The at least one lumped inductive element may be a first lumped inductive element, the plasma lamp further comprising a second lumped inductive element, the first and second lumped inductive elements extending from opposed end walls of the conductive enclosure, the first lumped inductive element being connected to the first conductive applicator located proximate a first end of the bulb and the second lumped inductive element being connected to the second conductive applicator located proximate a second end of the bulb. The second lumped inductive element may be grounded to the conductive enclosure.

In an example embodiment, the plasma lamp further comprises a first impedance matching network (e.g., a lumped capacitive element) connected between the first lumped inductive element and the RF feed. A second impedance matching network may be connected between the second lumped inductive element and a second RF feed.

In an example embodiment, an upper side of the conductive enclosure defines an opening through which the bulb extends. The bulb may be elongate and extend along an axis parallel to a plane in which an upper surface of the conductive enclosure extends.

The at least one lumped inductive component may provide a quarter wave phase shift at a resonant frequency for the conductive enclosure. The resonant frequency of the plasma lamp may be between about 10 MHz and about 500 MHz.

The RF feed may be provided in a side wall, end wall or bottom wall of the conductive enclosure and the at least one lumped inductive element extends from the side wall into the conductive enclosure, an end portion of the at least one lumped inductive element extending towards an end of the bulb.

In an example embodiment, the plasma lamp includes a bulb support assembly to support the bulb at least partially within the lamp enclosure. The bulb support may include an elongate channel formation in which the bulb is seated, and spaced conductive applicators located at proximate opposed ends of the bulb, each conductive applicator being connected to a lumped inductive element located within the conductive enclosure. The spaced conductive applicators may hold the bulb captive within the elongate channel formation.

In an example embodiment, the plasma lamp comprises plasma modification elements to modify the shape and/or the position of a plasma arc formed within the bulb. The plasma modification elements may be conductive elements coated on a ceramic material forming the elongate channel formation. The plasma modification elements may be conductive elements that are positioned to draw the plasma arc towards an exposed side of the bulb.

The feed may be an RF releasable connector mounted to an end wall of the conductive enclosure. The conductive enclosure is, in an example embodiment, a parallelepiped comprising spaced parallel side walls, spaced parallel end walls, and spaced parallel top and bottom walls, the top wall having an opening through which the bulb at least partially extends.

Further, in an example embodiment, a method of coupling power to a bulb in an electrodeless plasma lamp is provided. The method may comprise providing an electrodeless plasma lamp having a conductive enclosure including a dielectric material and a bulb containing a fill to form a light emitting plasma, coupling RF power from an RF power source into the conductive enclosure, shifting the phase of the power using a lumped inductive element provided inside the conductive enclosure, and coupling power from the lumped inductive element via a conductive applicator to the bulb. The power may be coupled via the conductive applicator proximate an end of the bulb and a ground path is provided from another conductive applicator coupled via another lumped inductive element to the conductive enclosure.

What is claimed is:

1. An electrodeless plasma lamp comprising:
a conductive enclosure including a dielectric material;
a bulb containing a fill to form a light emitting plasma;
a radio frequency (RF) feed connectable to an RF power source and configured to couple RF power into the conductive enclosure;
at least one conductive applicator to apply power from the conductive enclosure to the bulb; and
at least one lumped inductive element coupled between the RF feed and conductive applicator.

2. The plasma lamp of claim 1, wherein the conductive enclosure defines a hollow cavity and the at least one lumped inductive element is positioned at least partially within the conductive enclosure.

3. The plasma lamp of claim 1, wherein the at least one lumped inductive element is coupled to the RF feed and extends within the conductive enclosure terminating proximate an end of the bulb.

4. The plasma lamp of claim 1, wherein the lumped inductive element has an inductance of between about 5 nanohenries and 5000 nanoHenries dependent upon an operating frequency of the plasma lamp.

5. The plasma lamp of claim 1, wherein an upper side of the conductive enclosure defines an opening through which the bulb extends.

6. The plasma lamp of claim 1, wherein the bulb is elongate and extends along an axis parallel to a plane in which an upper surface of the conductive enclosure extends.

7. The plasma lamp of claim 1, wherein the RF feed is provided in a end wall of the conductive enclosure and the at least one lumped inductive element extends from the end wall into the conductive enclosure, an end portion of the at least one lumped inductive element extending towards an end of the bulb.

8. The plasma lamp of claim 1, wherein the RF feed is an RF releasable connector mounted to an end wall of the conductive enclosure.

9. The plasma lamp of claim 1, wherein the conductive enclosure is a parallelepiped comprising:
spaced parallel side walls;
spaced parallel end walls; and
spaced parallel top and bottom walls, the top wall having an opening through which the bulb at least partially extends.

10. The plasma lamp of claim 1, wherein the dielectric material is air.

11. The plasma lamp of claim 10, further comprising a second impedance matching network connected between the second lumped inductive element and a second RF feed.

12. The plasma lamp of claim 1, wherein the at least one lumped inductive component provides a quarter wave phase shift at a resonant frequency for the conductive enclosure.

13. The plasma lamp of claim 12, wherein the resonant frequency is between about 10 MHz and about 500 MHz.

14. The plasma lamp of claim 1, wherein the at least one lumped inductive element is a helically wound coil.

15. The plasma lamp of claim 14, wherein a radius of the coil is between about 2 millimeters and about 60 millimeters.

16. The plasma lamp of claim 14, wherein a length of the coil is between about 10 millimeters and about 200 millimeters.

17. The plasma lamp of claim 14, wherein the coil is wound from a hollow material.

18. The plasma lamp of claim 14, wherein the helically wound coil is provided with a ferrite material having a higher relative magnetic permeability than air.

19. The plasma lamp of claim 1, wherein the at least one conductive applicator is a first conductive applicator, the plasma lamp further comprising a second conductive applicator, the first and second conductive applicators being located proximate opposed ends of the bulb.

20. The plasma lamp of claim 19, wherein the at least one lumped inductive element is a first lumped inductive element, the plasma lamp further comprising a second lumped inductive element, the first and second lumped inductive elements extending from opposed end walls of the conductive enclosure, the first lumped inductive element being connected to the first conductive applicator located proximate a first end of the bulb and the second lumped inductive element being connected to the second conductive applicator located proximate a second end of the bulb.

21. The plasma lamp of claim 20, wherein the second lumped inductive element is grounded to the conductive enclosure.

22. The plasma lamp of claim 20, further comprising a first impedance matching network connected between the first lumped inductive element and the RF feed.

23. The plasma lamp of claim 22, wherein the impedance matching network is a lumped capacitive element.

24. The plasma lamp of claim 1, further comprising a bulb support assembly to support the bulb at least partially within the conductive enclosure.

25. The plasma lamp of claim 24, wherein the bulb support assembly comprises:
an elongate channel formation in which the bulb is seated; and
spaced conductive applicators located proximate opposed ends of the bulb, each conductive applicator being connected to a lumped inductive element located within the conductive enclosure.

26. The plasma lamp of claim 25, wherein the spaced conductive applicators hold the bulb captive within the elongate channel formation.

27. The plasma lamp of claim 24, further comprising plasma modification elements to modify a shape and/or a position of a plasma arc formed within the bulb.

28. The plasma lamp of claim 27, wherein the plasma modification elements are conductive elements coated on a ceramic material forming the elongate channel formation.

29. The plasma lamp of claim 27, wherein the plasma modification elements are conductive elements are positioned to draw the plasma arc towards an exposed side of the bulb.

30. A method of coupling power to a bulb in an electrodeless plasma lamp, the method comprising, providing an electrodeless plasma lamp having a conductive enclosure including a dielectric material and a bulb containing a fill to form a light emitting plasma;

coupling radio frequency (RF) power from an RF power source into the conductive enclosure;

shifting a phase of the power using a lumped inductive element provided inside the conductive enclosure; and coupling power from the lumped inductive element via a conductive applicator to the bulb.

31. The method of claim 30, wherein the power is coupled via the conductive applicator proximate an end of the bulb and a ground path is provided from another conductive applicator coupled via another lumped inductive element to the conductive enclosure.

\* \* \* \* \*